(12) United States Patent
Tsukamoto et al.

(10) Patent No.: US 12,330,317 B2
(45) Date of Patent: Jun. 17, 2025

(54) CALIBRATION METHOD AND ROBOT SYSTEM

(71) Applicant: SEIKO EPSON CORPORATION, Tokyo (JP)

(72) Inventors: Kentaro Tsukamoto, Azumino (JP); Kenji Matsuura, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 264 days.

(21) Appl. No.: 18/323,504

(22) Filed: May 25, 2023

(65) Prior Publication Data

US 2023/0381969 A1    Nov. 30, 2023

(30) Foreign Application Priority Data

May 30, 2022    (JP) ................................ 2022-087478

(51) Int. Cl.
*B25J 9/02*    (2006.01)
*B25J 9/16*    (2006.01)
*B25J 19/02*   (2006.01)

(52) U.S. Cl.
CPC ............. *B25J 9/1692* (2013.01); *B25J 9/02* (2013.01); *B25J 9/1664* (2013.01); *B25J 19/023* (2013.01)

(58) Field of Classification Search
CPC ...... B25J 19/023; B25J 9/1664; B25J 9/1692; B25J 9/02; B25J 9/1697; G05B 2219/39045; G05B 2219/39057; G05B 2219/39016
See application file for complete search history.

(56) References Cited

U.S. PATENT DOCUMENTS

| 8,086,749 B2* | 12/2011 | Townsley ............. H04L 69/168 370/395.5 |
| 9,855,101 B2* | 1/2018 | Wenderow ............. A61B 34/30 |
| 2016/0288333 A1 | 10/2016 | Yamaguchi et al. |

FOREIGN PATENT DOCUMENTS

| JP | H08-085083 A | 4/1996 |
| JP | 2016-187846 A | 11/2016 |

OTHER PUBLICATIONS

Herrejon et al., Composite visual servoing for catching a 3-D flying object using RLS trajectory estimation from a monocular image sequence, 2009, IEEE, p. 1-6 (Year: 2009).*
Yoshimi et al., Active, uncalibrated visual servoing, 1994, IEEE, p. 156-161 (Year: 1994).*

(Continued)

*Primary Examiner* — McDieunel Marc
(74) *Attorney, Agent, or Firm* — Harness, Dickey & Pierce, P.L.C.

(57) ABSTRACT

A method form performing calibration between a robot and a camera includes achieving a first state in which a criterion point of an image is captured with the camera, achieving a second state in which the camera is rotated by a first angle of rotation around a first imaginary axis passing through a control point at the arm, achieving a third state in which the criterion point is located at the center of the image captured with the camera, achieving a fourth state in which the camera is rotated by a second angle of rotation around a second imaginary axis passing through a reference point, achieving a fifth state in which that criterion point is located at the center of the image captured with the camera, and performing the calibration between the robot and the camera.

9 Claims, 17 Drawing Sheets

(56) References Cited

OTHER PUBLICATIONS

Peng et al., A Visual Kinematics Calibration Method for Manipulator Based on Nonlinear Optimization, 2022, IEEE, p. 4521-4526 (Year: 2022).*

Stein, Accurate internal camera calibration using rotation, with analysis of sources of error, 1995, IEEE, p. 230-236 (Year: 1995).*

* cited by examiner

CALIBRATION METHOD AND ROBOT SYSTEM

The present application is based on, and claims priority from JP Application Serial Number 2022-087478, filed May 30, 2022, the disclosure of which is hereby incorporated by reference herein in its entirety.

BACKGROUND

1. Technical Field

The present disclosure relates to a calibration method and a robot system.

2. Related Art

In related art, before a workpiece is processed with a tool with which an arm is equipped, an offset of the tool relative to the arm is set. JP-A-8-85083 discloses a method for deriving an offset of a tool with which an arm is equipped with respect to the arm based on the results of the operation of aligning the tool with a criterion point in real space, the operation performed multiple times with the posture of the arm changed each time.

According to the technology described in JP-A-8-85083, an operator needs to teach the position of the criterion point by manipulating the arm in such a way that the tool touches the criterion point. It is, however, not easy to accurately manipulate the arm while visually identifying the boundary between the state in which the arm touches the criterion point and the state in which the arm does not touch the criterion point. That is, the technology described in JP-A-8-85083 does not readily allow accurate teaching of the position of the criterion point. To set an offset of the tool while accurately teaching the position of the criterion point, a problem of a prolonged period required for the setting occurs, and the problem becomes serious as the number of robots to be set increases.

SUMMARY

A calibration method according to an aspect of the present disclosure is a method for performing calibration between a robot coordinate system that is a coordinate system of a robot including an arm and a camera coordinate system that is a coordinate system of a camera attached to the arm, the method including moving the robot to achieve a first state in which a criterion point located at a predetermined surface is located at a predetermined position in an image captured with the camera, moving the robot to achieve a second state in which the camera is rotated by a first angle of rotation around a first imaginary axis perpendicular to the predetermined surface and passing through a control point set at the arm, moving the robot to achieve a third state in which the criterion point is located at the predetermined position in the image captured with the camera, deriving a reference point that is a provisional position of the criterion point based on information on the first state, information on the third state, and the first angle of rotation, moving the robot to achieve a fourth state in which the camera is rotated by a second angle of rotation around a second imaginary axis perpendicular to the predetermined surface and passing through the reference point, moving the robot to achieve a fifth state in which the criterion point is located at the predetermined position in the image captured with the camera, deriving a position of the criterion point from the information on the first state, information on the fifth state, the first angle of rotation, and the second angle of rotation, or the information on the third state, the information on the fifth state, and the second angle of rotation, and performing the calibration between the robot coordinate system and the camera coordinate system based on the derived position of the criterion point.

A calibration method according to another aspect of the present disclosure is a method for performing calibration between a robot coordinate system that is a coordinate system of a robot including an arm and a camera coordinate system that is a coordinate system of a camera attached to the arm, the method including moving the robot to achieve a first state in which a criterion point located at a predetermined surface is located at a predetermined position in an image captured with the camera, moving the robot to achieve a fourth state in which the camera is rotated by a first angle of rotation around a first imaginary axis perpendicular to the predetermined surface and passing through a control point set at the arm, moving the robot to achieve a fifth state in which the criterion point is located at the predetermined position in the image captured with the camera, deriving a position of the criterion point from information on the first state, information on the fifth state, and the first angle of rotation, and performing the calibration between the robot coordinate system and the camera coordinate system based on the derived position of the criterion point.

A calibration method according to another aspect of the present disclosure a method for performing calibration between a robot coordinate system that is a coordinate system of a robot including an arm and a camera coordinate system that is a coordinate system of a camera attached to the arm, the method including moving the robot to achieve a sixth state in which a criterion point located at a predetermined plane is located at a predetermined position in an image captured with the camera, deriving a reference point that is a provisional position of the criterion point, moving the robot to achieve a seventh state in which the camera is rotated by a third angle of rotation around a third imaginary axis perpendicular to the predetermined surface and passing through the reference point, moving the robot to achieve an eighth state in which the criterion point is located at the predetermined position in the image captured with the camera, deriving a position of the criterion point from information on the sixth state, information on the eighth state, and the third angle of rotation, and performing the calibration between the robot coordinate system and the camera coordinate system based on the derived position of the criterion point.

A robot system according to another aspect of the present disclosure include a robot including the arm, a camera attached to the arm, and a control apparatus that controls the operation of driving the robot. To perform calibration between a robot coordinate system that is a coordinate system of the robot and a camera coordinate system that is a coordinate system of the camera, the control apparatus moves the robot to achieve a first state in which a criterion point located at a predetermined surface is located at a predetermined position in an image captured with the camera, moves the robot to achieve a second state in which the camera is rotated by a first angle of rotation around a first imaginary axis perpendicular to the predetermined surface and passing through a control point set at the arm, moves the robot to achieve a third state in which the criterion point is located at the predetermined position in the image captured with the camera, derives a reference point that is a provisional position of the criterion point based on information on the first state, information on the third state, and the first angle of rotation, moves the robot to achieve a fourth state in which the camera is rotated by a second angle of rotation around a second imaginary axis perpendicular to the predetermined surface and passing through the reference point, moves the robot to achieve a fifth state in which the criterion point is located at the predetermined position in the image captured with the camera, derives a position of the criterion point from the information on the first state, information on the fifth state, the first angle of rotation, and the second angle of rotation, or the information on the third state, the information on the fifth state, and the second angle of rotation, and performs the calibration between the robot coordinate system and the camera coordinate system based on the derived position of the criterion point.

DESCRIPTION OF EXEMPLARY EMBODIMENTS

A calibration method and a robot system according to preferable embodiments of the present disclosure will be described below in detail with reference to the accompanying drawings.

First Embodiment

Figure 1:
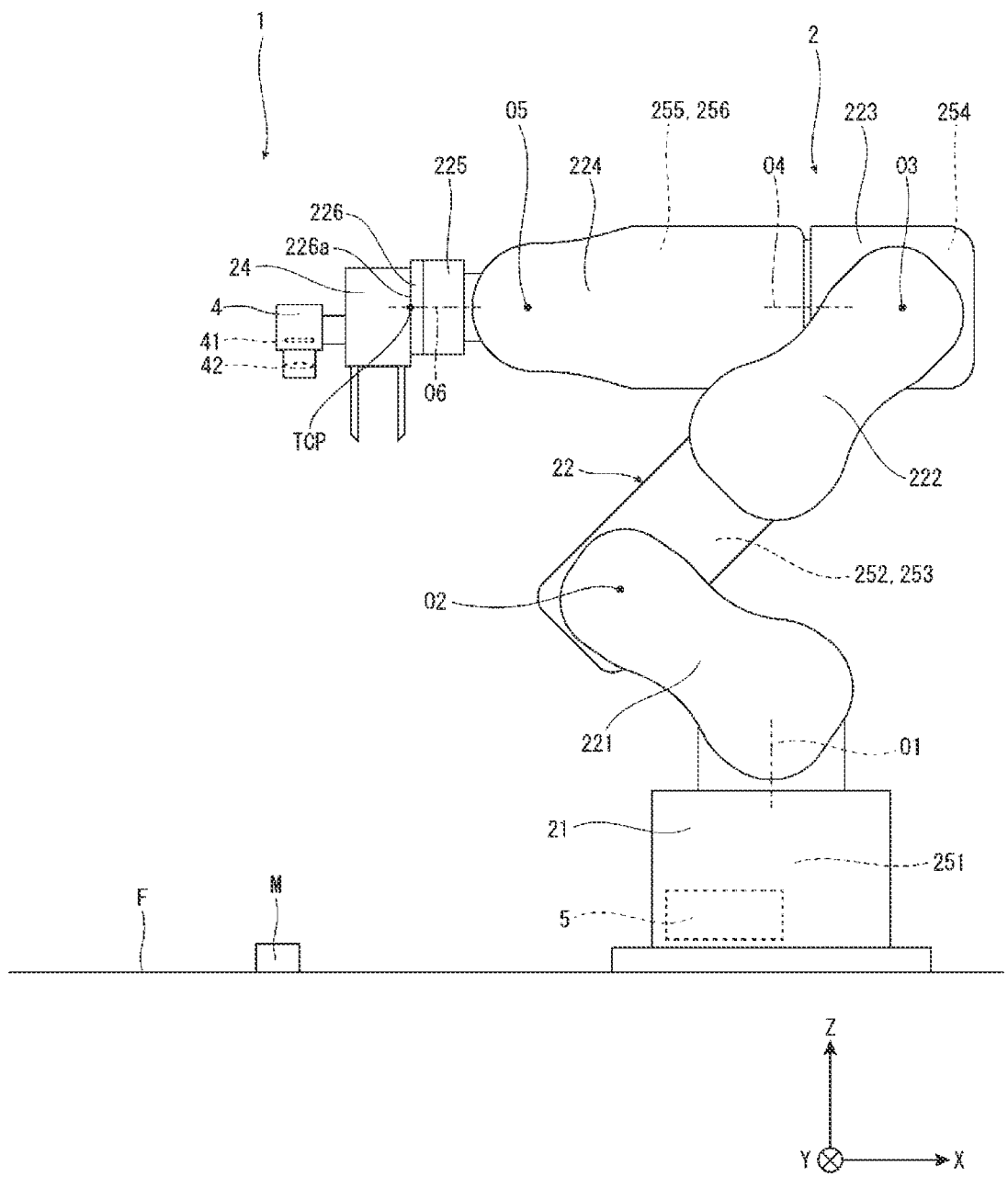
FIG. 1 is an overall configuration diagram of a robot system according to a first embodiment.
Figure 2:
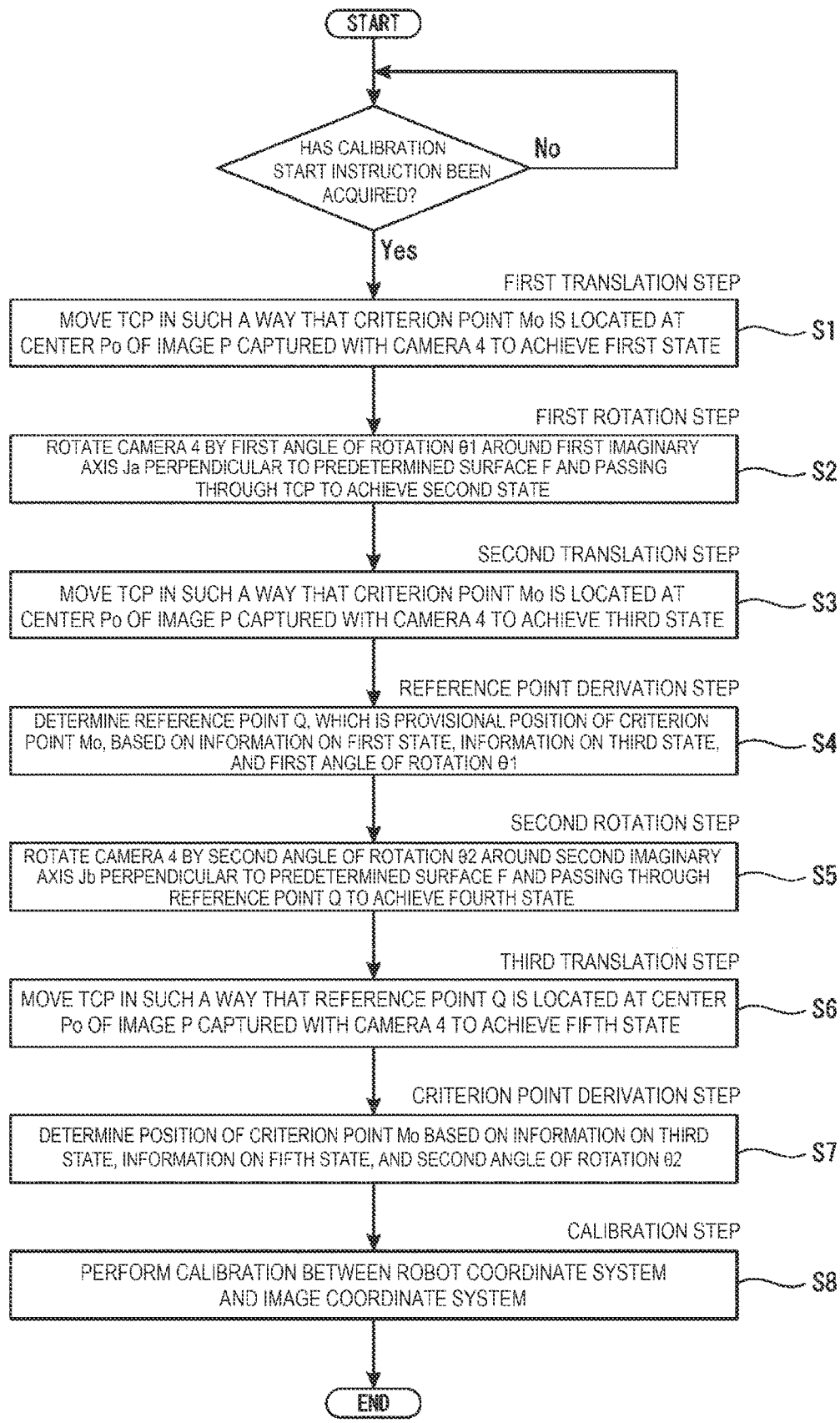
FIG. 2 is a flowchart showing a calibration step.
Figure 3:
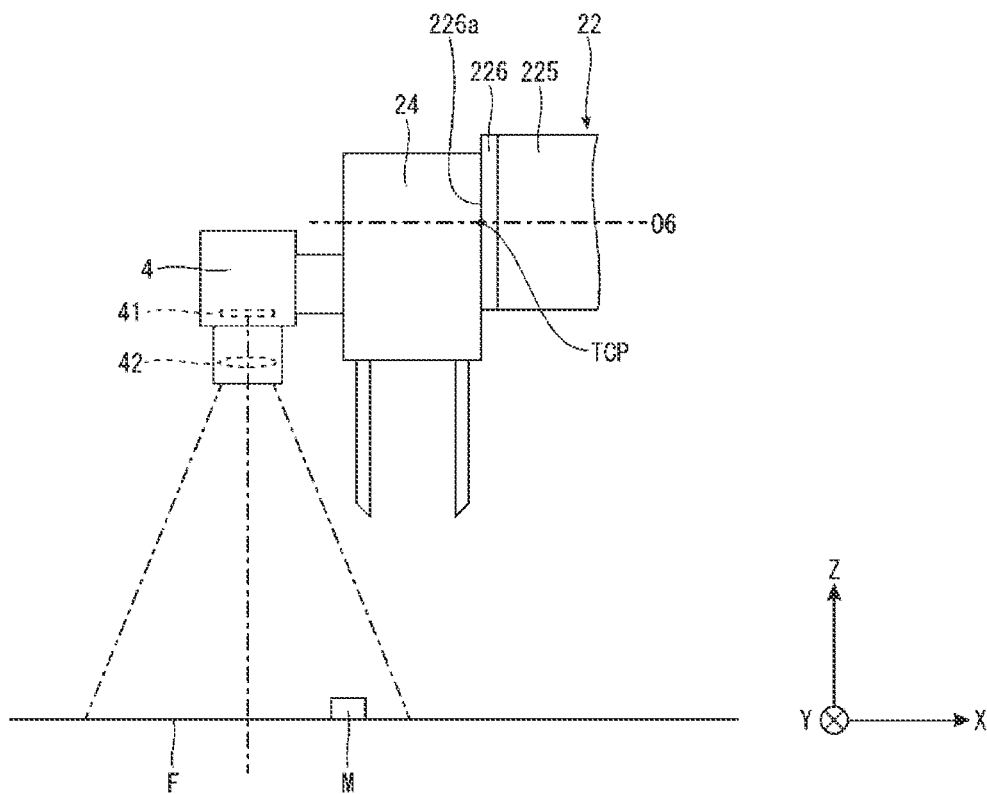
FIG. 3 shows the state of a robot system at the start of the calibration.
Figure 4:
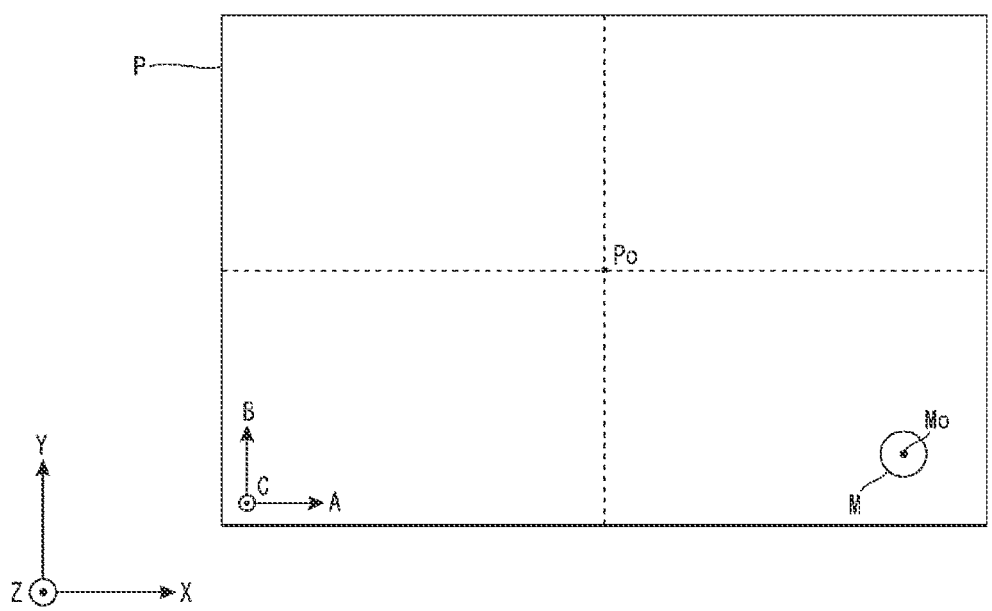
FIG. 4 shows an image captured with a camera at the start of the calibration.
Figure 5:
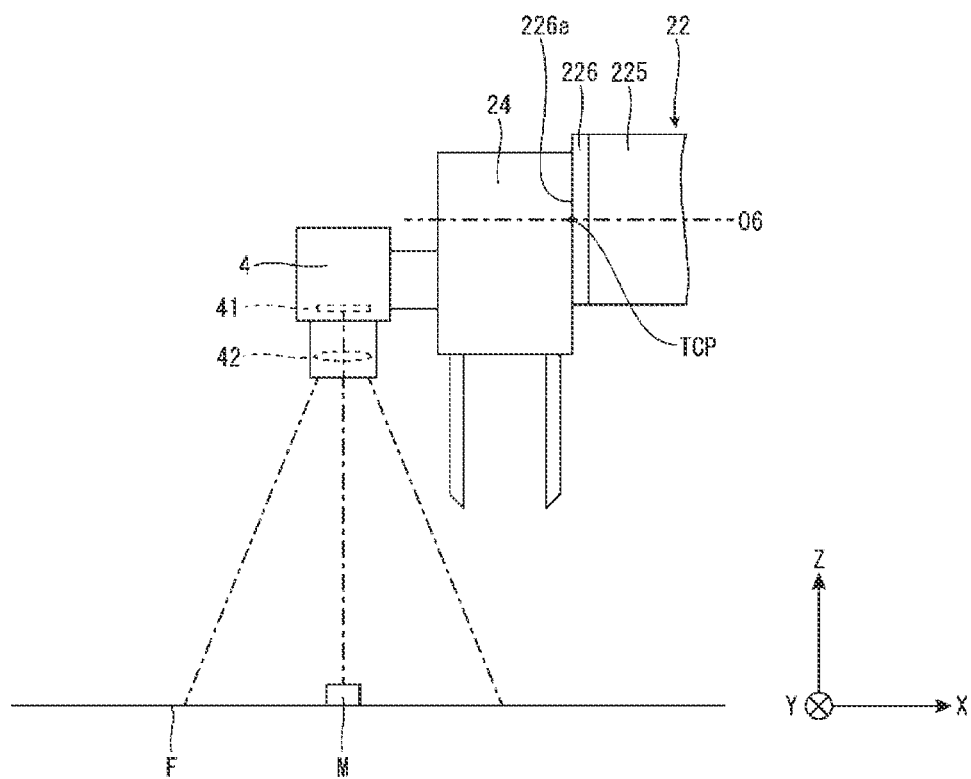
FIG. 5 shows the state of the robot system at the end of a first translation step.
Figure 6:
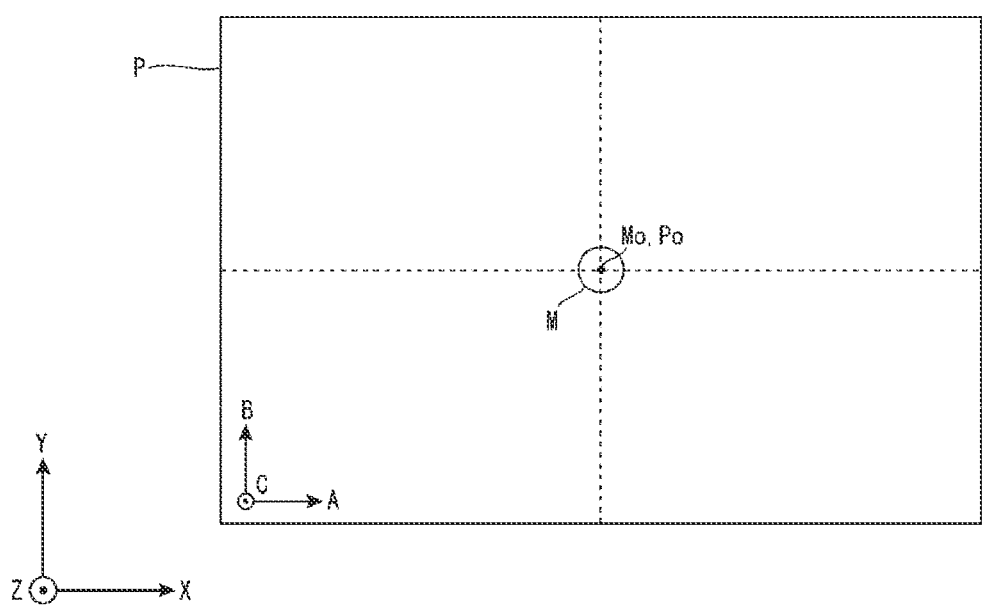
FIG. 6 shows an image captured with the camera at the end of the first translation step.
Figure 7:
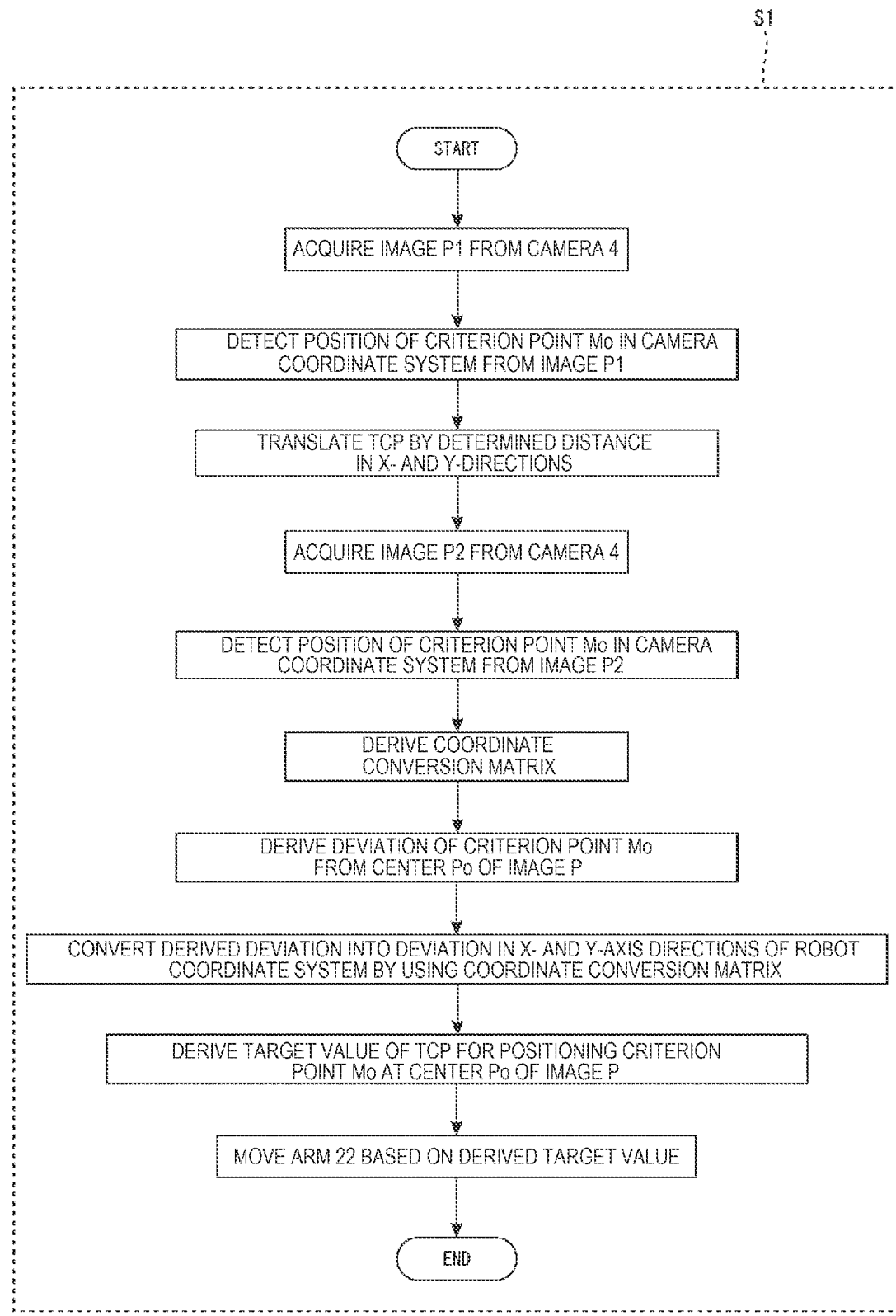
FIG. 7 is a flowchart showing a first translation step in detail.
Figure 8:
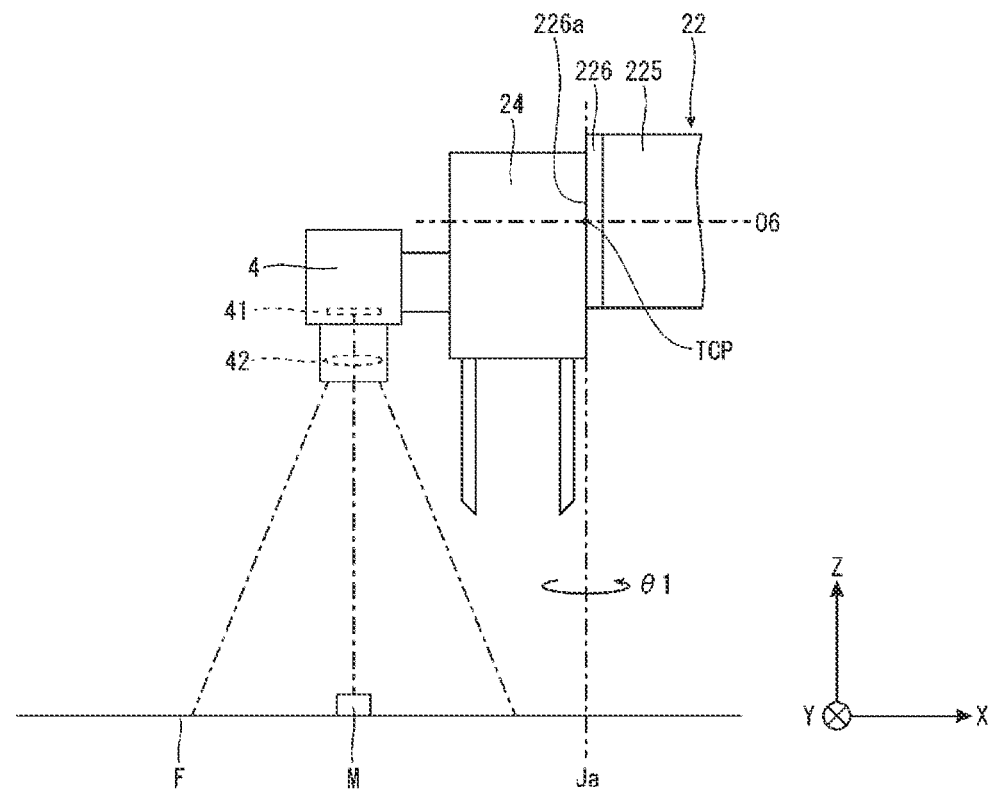
FIG. 8 shows the state of the robot system at the end of a first rotation step.
Figure 9:
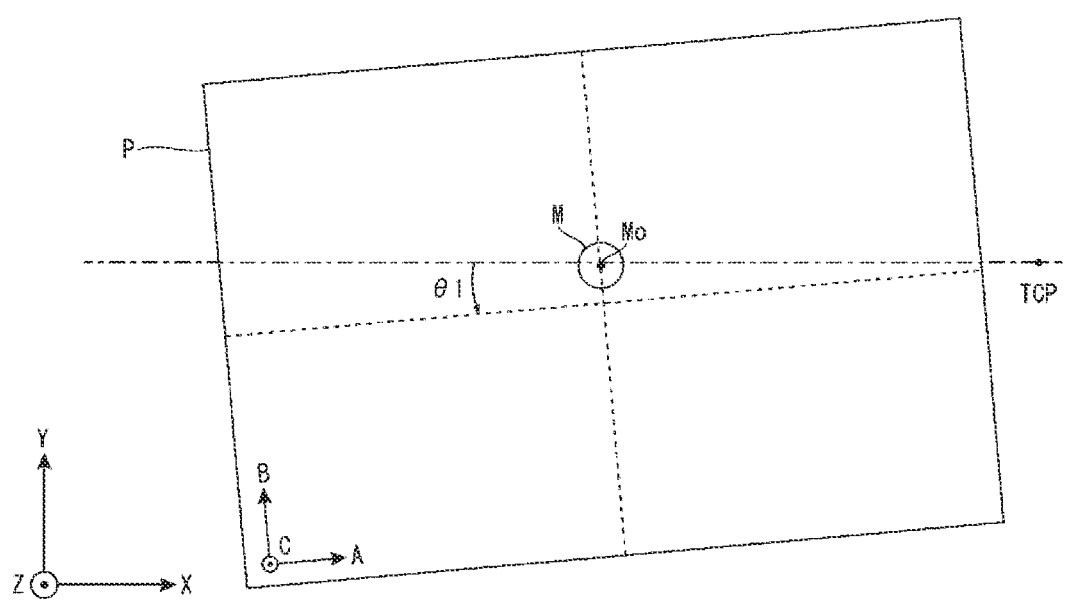
FIG. 9 shows an image captured with the camera at the end of the first rotation step.
Figure 10:
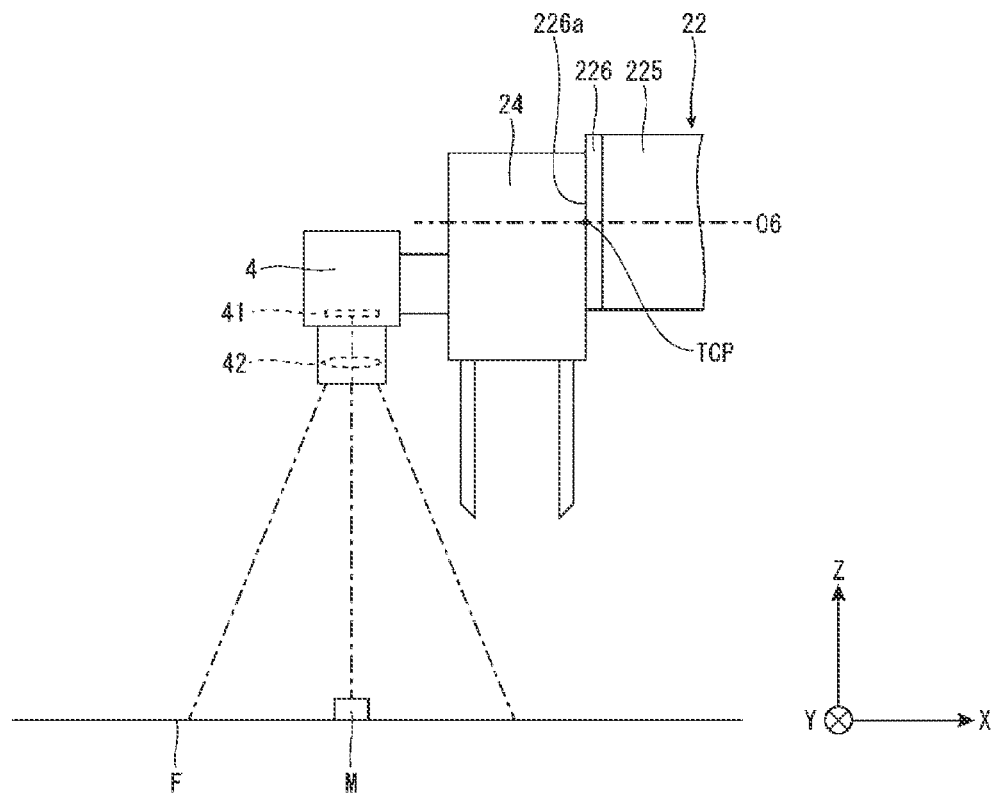
FIG. 10 shows the state of the robot system at the end of a second translation step.
Figure 11:
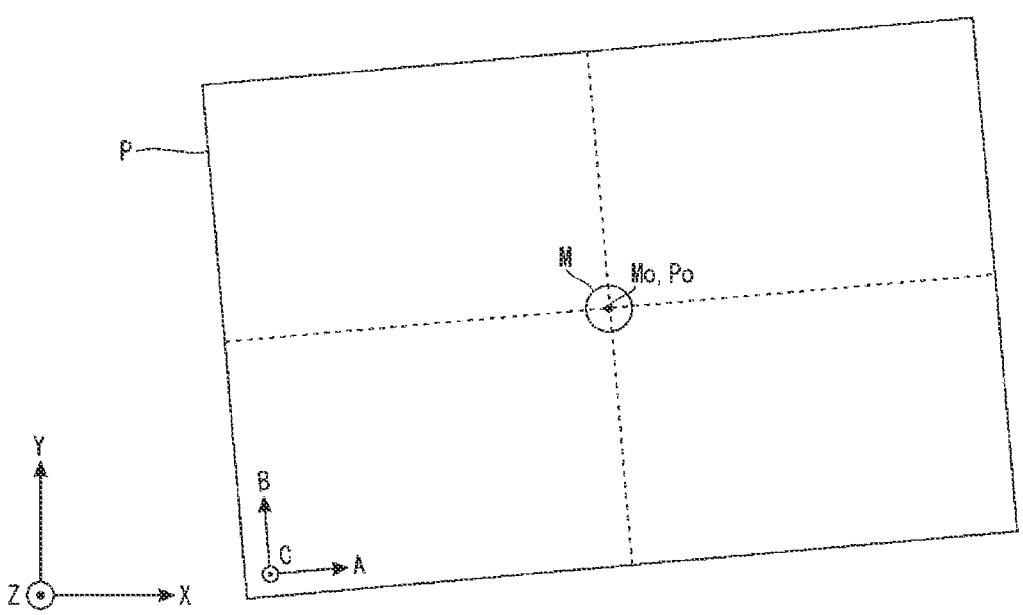
FIG. 11 shows an image captured with the camera at the end of the second translation step.
Figure 12:
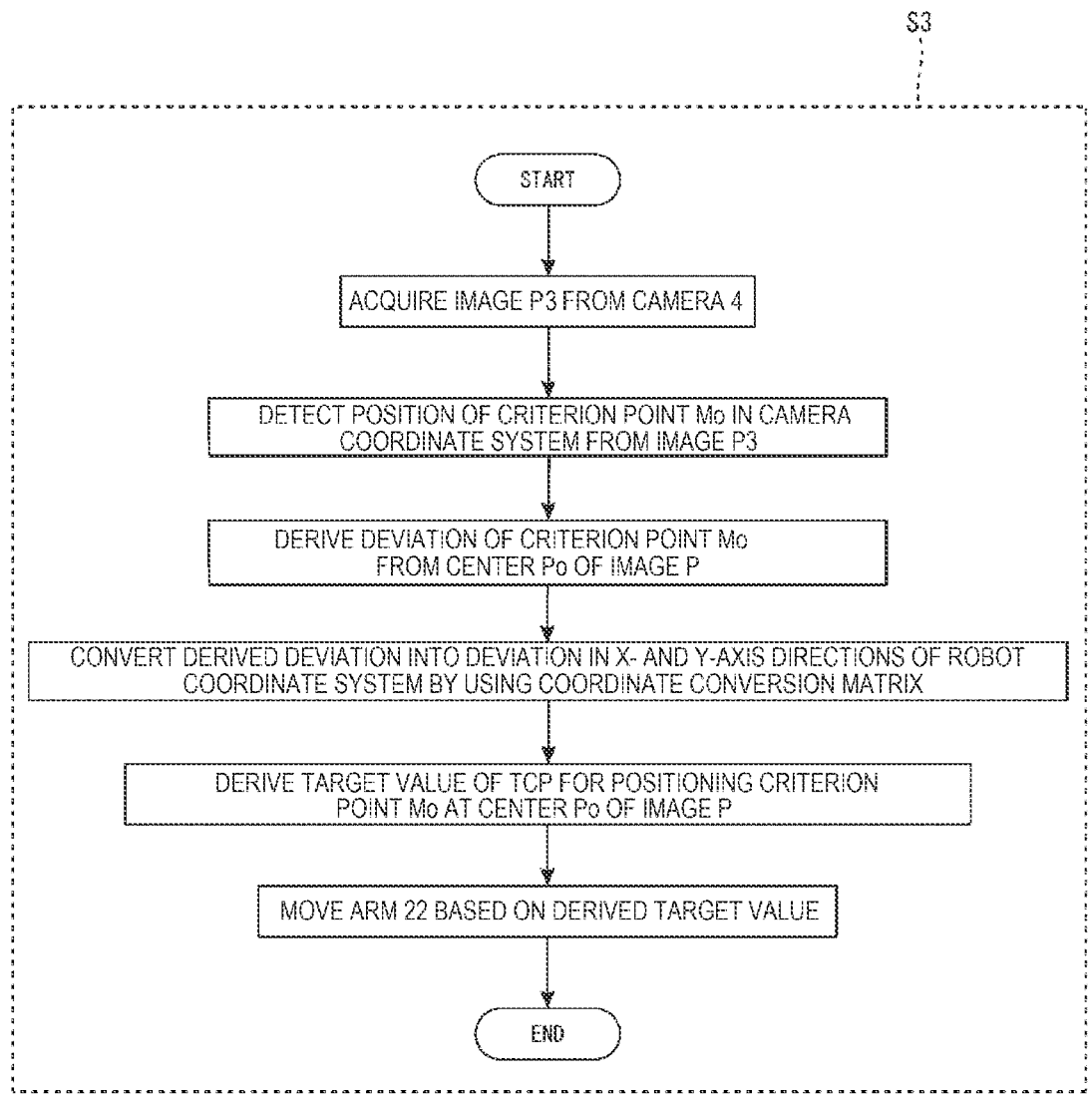
FIG. 12 is a flowchart showing the second translation step in detail.
Figure 13:
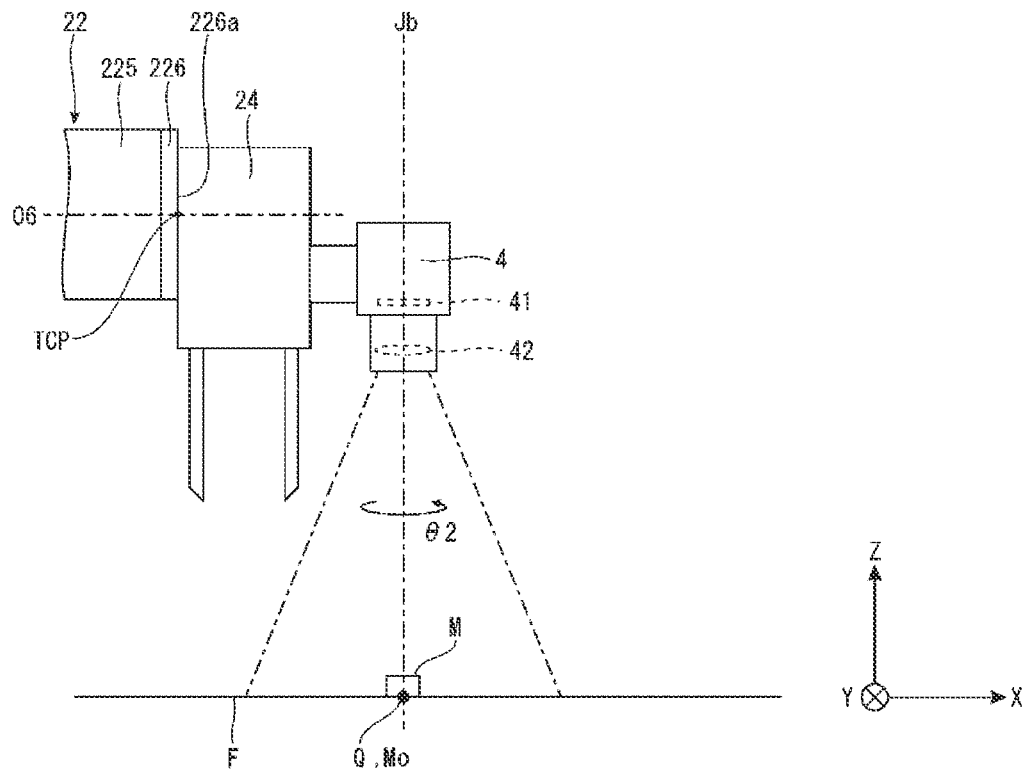
FIG. 13 shows the state of the robot system at the end of a second rotation step.
Figure 14:
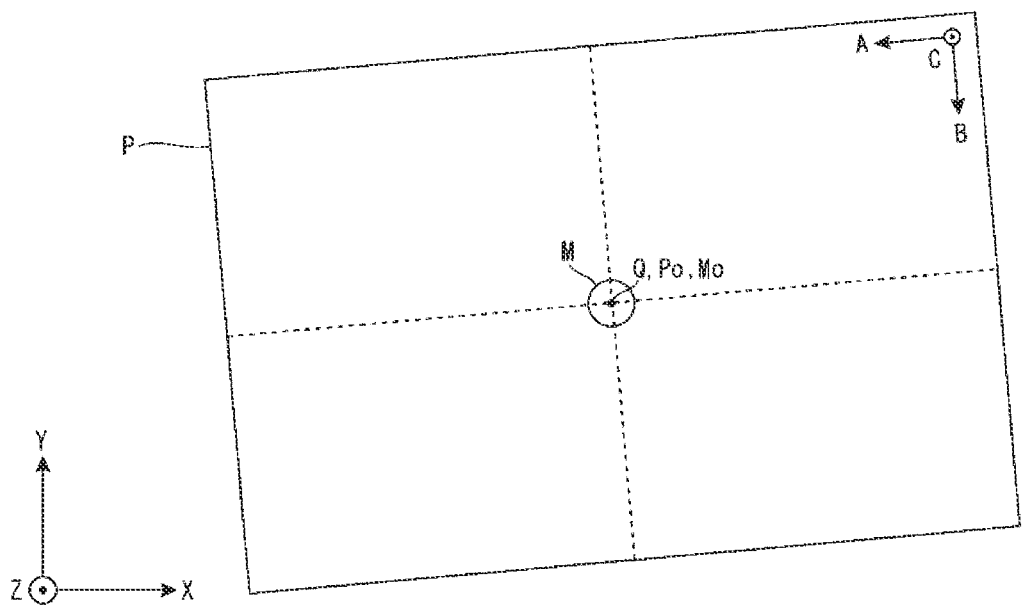
FIG. 14 shows an image captured with the camera at the end of the second rotation step.
Figure 15:
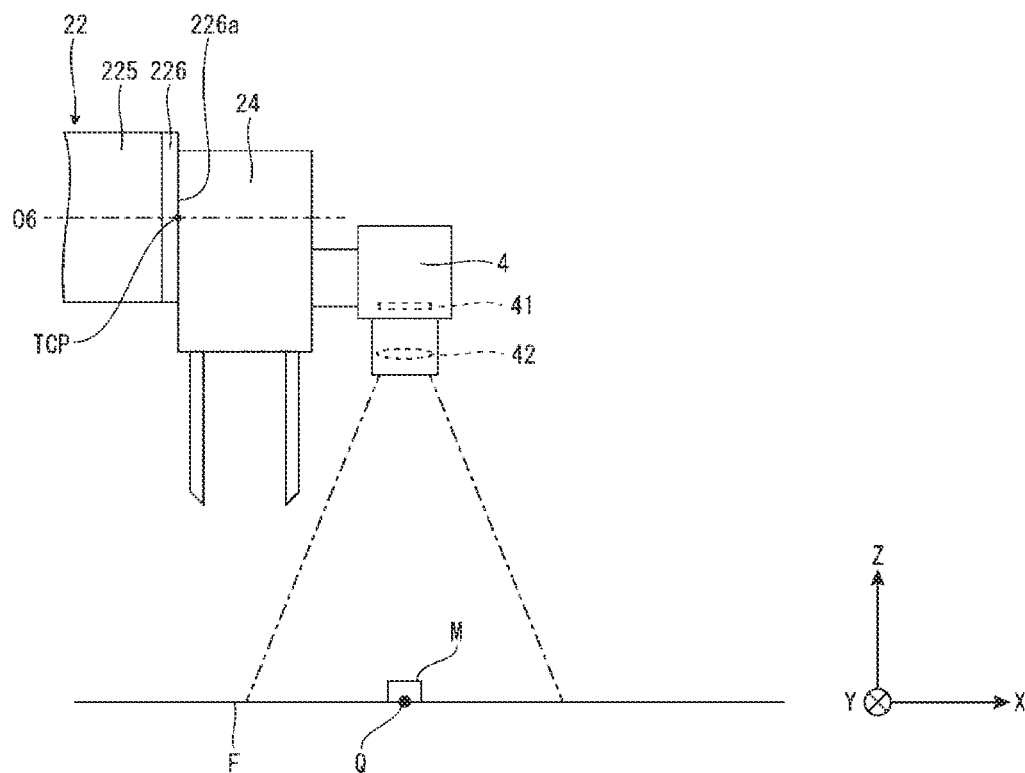
FIG. 15 shows the state of the robot system at the end of a third translation step.
Figure 16:
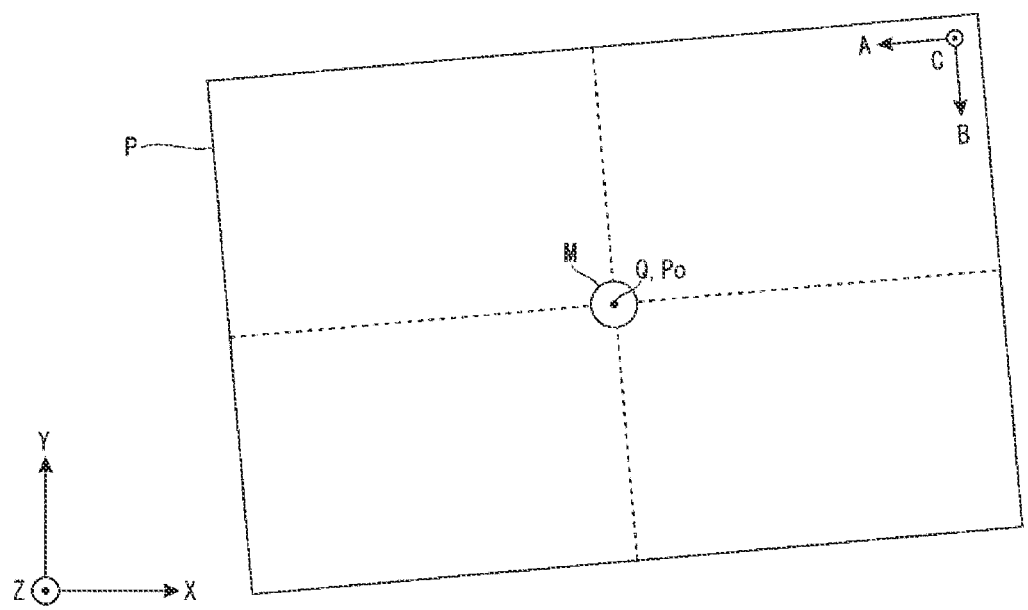
FIG. 16 shows an image captured with the camera at the end of the third translation step.
Figure 17:
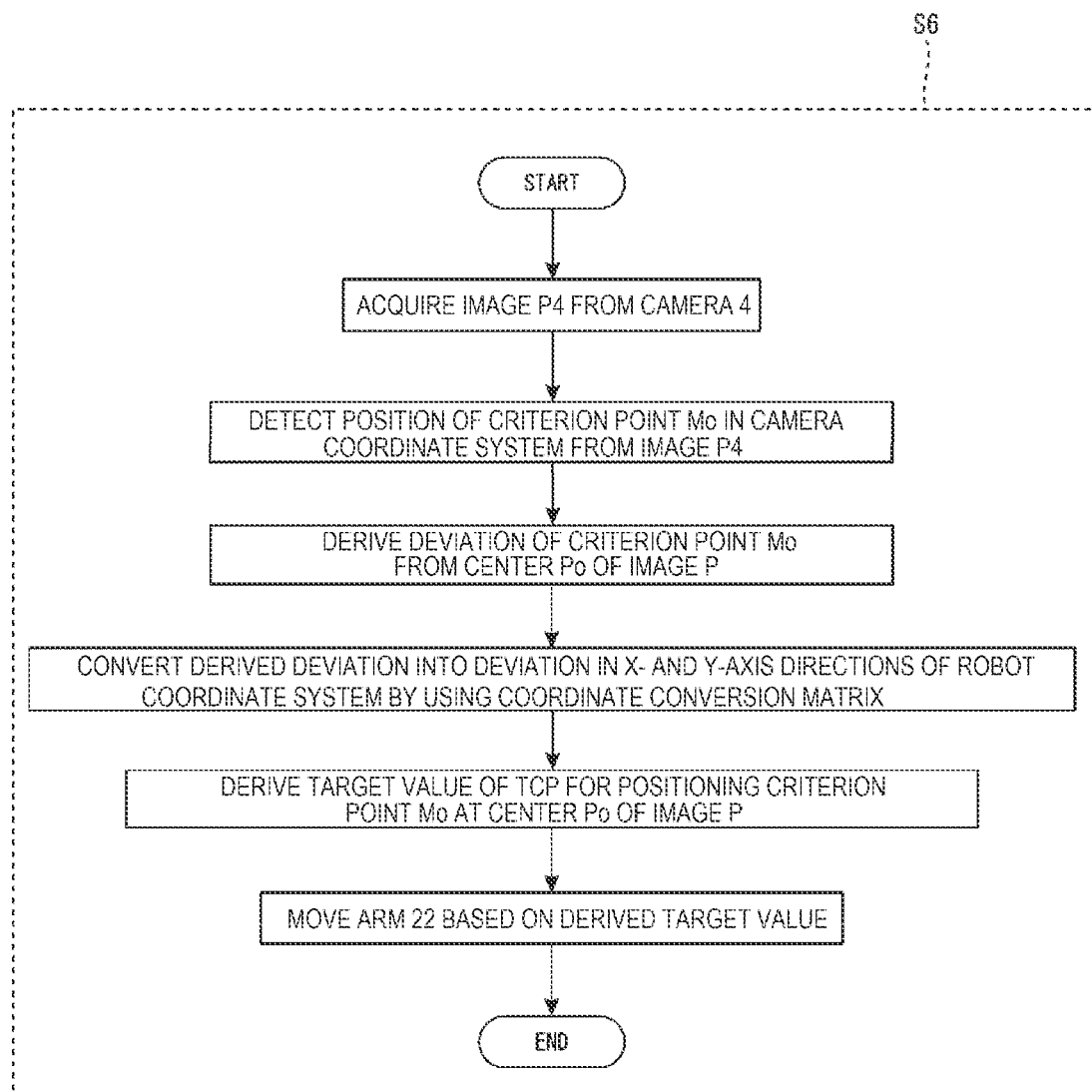
FIG. 17 is a flowchart showing the third translation step in detail.
Figure 18:
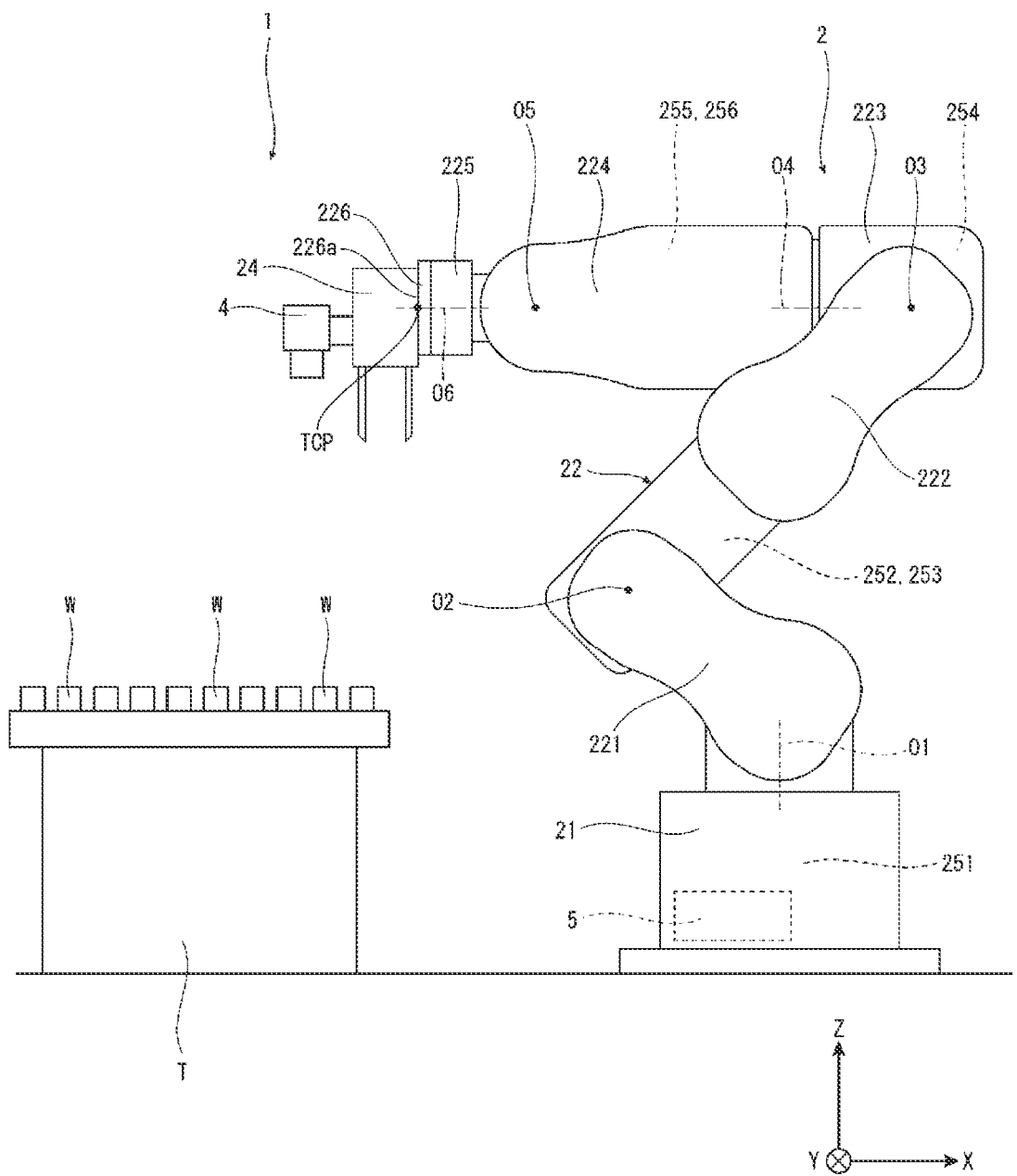
FIG. 18 shows an example of a task performed by the robot system.

FIG. 1 is an overall configuration diagram of a robot system according to a first embodiment. FIG. 2 is a flowchart showing a calibration step. FIG. 3 shows the state of the robot system at the start of the calibration. FIG. 4 shows an image captured with a camera at the start of the calibration. FIG. 5 shows the state of the robot system at the end of a first translation step. FIG. 6 shows an image captured with the camera at the end of the first translation step. FIG. 7 is a flowchart showing the first translation step in detail. FIG. 8 shows the state of the robot system at the end of a first rotation step. FIG. 9 shows an image captured with the camera at the end of the first rotation step. FIG. 10 shows the state of the robot system at the end of a second translation step. FIG. 11 shows an image captured with the camera at the end of the second translation step. FIG. 12 is a flowchart showing the second translation step in detail. FIG. 13 shows the state of the robot system at the end of a second rotation step. FIG. 14 shows an image captured with the camera at the end of the second rotation step. FIG. 15 shows the state of the robot system at the end of a third translation step. FIG. 16 shows an image captured with the camera at the end of the third translation step. FIG. 17 is a flowchart showing the third translation step in detail. FIG. 18 shows an example of a task performed by the robot system.

A robot system 1 shown in FIG. 1 includes a robot 2, a camera 4, and a control apparatus 5, which controls the operation of driving the robot 2 based on an image captured with the camera 4. The portions described above can communicate with each other in a wired or wireless manner. The communication may be performed via a network such as the Internet.

Robot 2

The robot 2, for example, supplies, removes, transports, assembles, and otherwise handles a precision instrument and parts that form the precision instrument. The robot 2, however, is not necessarily used in a specific application. The robot 2 is a six-axis robot having six pivotal axes, and includes a base 21 fixed to a floor, ceiling, or any other surface and an arm 22 linked to the base 21.

The arm 22 includes a first arm 221, which is linked to the base 21 pivotably around a first pivotal axis O1, a second arm 222 linked to the first arm 221 pivotably around a second pivotal axis O2, a third arm 223 linked to the second arm 222 pivotably around a third pivotal axis O3, a fourth arm 224 linked to the third arm 223 pivotably around a fourth pivotal axis O4, a fifth arm 225 linked to the fourth arm 224 pivotably around a fifth pivotal axis O5, and a sixth arm 226 linked to the fifth arm 225 pivotably around a sixth pivotal axis O6.

A tool attachment surface 226a is provided at the front end of the sixth arm 226, and is equipped with a tool 24, and the tool 24 is further equipped with the camera 4. The tool 24 can be selected as appropriate in accordance with a task to be performed by the robot 2. In the present embodiment, the tool 24 is a hand having a pair of hooking fingers that open and close. The tool 24 is disposed perpendicularly to the sixth pivotal axis O6. The state in which the tool 24 is disposed perpendicularly to the sixth pivotal axis O6 refers to the state in which a line passing through the position of the front end of the tool 24 and extending in a direction along the tool attachment surface 226a is perpendicular to the sixth pivotal axis O6. Note that "perpendicular to" may refer to a state having a perpendicularity error, and the same holds true in the following description.

In the robot 2, a tool center point (hereinafter also called "TCP") as a control point is set at the front end of arm 22, specifically, at the center of the tool attachment surface 226a. The position and posture of TCP serves as a criterion of the position and posture of the tool 24. Note, however, that the position of TCP is not limited to a specific position.

The coordinate system of the robot 2 used to control the robot 2 is a three-dimensional orthogonal coordinate system defined by X-, Y- and Z-axes perpendicular to each other. In the present embodiment, the orthogonal coordinate system is so set that the Z-axis extends along the vertical direction (first pivotal axis O1). The thus set coordinate system of the robot 2 is also hereinafter called a "robot coordinate system".

The robot 2 further includes a first driver 251, which causes the first arm 221 to pivot with respect to the base 21, a second driver 252, which causes the second arm 222 to pivot with respect to the first arm 221, a third driver 253, which causes the third arm 223 to pivot with respect to the second arm 222, a fourth driver 254, which causes the fourth arm 224 to pivot with respect to the third arm 223, a fifth driver 255, which causes the fifth arm 225 to pivot with respect to the fourth arm 224, and a sixth driver 256, which causes the sixth arm 226 to pivot with respect to the fifth arm 225. The first to sixth drivers 251 to 256 each include, for example, a motor, a controller that controls the operation of driving the motor, and an encoder that detects the amount of rotation produced by the motor. The first to sixth drivers 251 to 256 are independently controlled by the control apparatus 5 to drive the respective arms.

Employing a 6-axis robot as the robot 2, as in the present embodiment, allows the robot 2 to perform complex motion and handle a wide range of tasks. The robot 2 is, however, not limited to a specific robot. For example, the number of arms that form the arms 22 may range from one to five or greater than or equal to seven. The robot 2 may instead, for example, be a SCARA robot (horizontal articulated robot), or a twin-armed robot with two arms 22. The robot 2 may still instead be a self-propelled robot that is not fixed to the floor, the ceiling, or any other surface.

Camera 4

The camera 4 is used to recognize the size, shape and position of a target object at a predetermined surface F perpendicular to the Z-axis. The camera 4 is a digital camera including a lens 42, an area image sensor 41, and an AD converter and other components that are not shown. The camera 4 is a component with which the tool 24 is equipped. The camera 4 is offset from the sixth pivotal axis O6 and has an optical axis perpendicular to the sixth pivotal axis O6. The camera 4, is however, not necessarily disposed in a specific manner and does not necessarily have an optical axis having specific orientation.

The coordinate system of the camera 4 is a three-dimensional orthogonal coordinate system defined by A-, B- and C-axes perpendicular to each other. In the present embodiment, the orthogonal coordinate system is so set that the A-axis extends along a horizontal direction of an image P captured with the camera 4, the B-axis extends along a horizontal direction of the image P and a direction perpendicular to the A-axis, and the C-axis extends along the direction perpendicular to the image P. The coordinate system of the image P captured with the camera 4 is also hereinafter called a "camera coordinate system".

In the camera 4, the positional relationship between the area image sensor 41 and the lens 42 is so defined that a center Po of the image P corresponds to the center of the optical system. That is, the points on the optical axis of the lens 42 are imaged to the center Po of the image P. In the camera coordinate system, the coordinate system of a plane present in the real space and perpendicular to the optical axis of the lens 42 is a two-dimensional orthogonal coordinate system non-linearly converted in accordance with the optical characteristics of the lens 42 (such as focal length and distortion) and the number and size of pixels of the area image sensor 41. Therefore, to recognize the size, shape, and position of a target object at the predetermined surface F based on the image P captured with the camera 4 and control the operation of driving the robot 2 based on the result of the recognition, the process of associating the camera coordinate system with the robot coordinate system, that is, calibration is required. A method for performing the calibration will be described later.

Control Apparatus 5

The control apparatus 5 is housed in the base 21 of the robot 2. The control apparatus 5 detects the position and posture of the target object based on the image P captured with the camera 4 and controls the operation of driving the arm 22 and the tool 24 based on the result of the detection. The robot 2 can thus perform a desired task. The control apparatus 5 is formed, for example, of a computer and includes a processor that processes information, a memory communicably coupled to the processor, and an external interface. The memory saves a variety of programs executable by the processor, and the processor reads the variety of programs and other pieces of information stored in the memory and executes the programs.

The control apparatus 5 is housed in the base 21 of the robot 2, but not necessarily. The control apparatus 5 may be provided in the space outside the base 21 of the robot 2. In this case, the control apparatus 5 and the robot 2 are electrically coupled to each other, for example, via a cable.

The configuration of the robot system 1 has been described. The calibration between the robot coordinate system set for the robot 2 and the camera coordinate system set for the camera 4 will next be described. The calibration between the robot coordinate system and the camera coordinate system is initiated by an operator through input of a calibration start instruction to the control apparatus 5 and is completed thereafter without any request to the operator but with simple operation performed by the operator. Before inputting the calibration start instruction, the operator desirably changes the orientation of the camera 4 to that in the actual task being done and moves TCP to a position where the camera 4 can capture an image of a marker M. By moving TCP to a position where the camera 4 can capture an image of the marker M as described above, no search for the marker M is required, and the calibration can be performed quickly and smoothly. The orientation of the camera 4 in the actual task depends on the nature of the task, but typically coincides with the orientation of the Z-axis. The optical axis of the camera 4 therefore extends along the Z-axis in the present embodiment. That is, the optical axis of the camera 4 is perpendicular to the predetermined surface F, which will be described later.

The method for performing the calibration between the robot coordinate system and the camera coordinate system (hereinafter simply also called "calibration method") includes a first translation step S1, a first rotation step S2, a second translation step S3, a reference point derivation step S4, a second rotation step S5, a third translation step S6, a criterion point derivation step S7, and a calibration step S8, as shown in FIG. 2. The calibration method described above is executed by using the marker M located at the predetermined surface F, as shown in FIG. 1. The marker M is not limited to a specific marker, and may, for example, be an object placed at the predetermined surface F, a sticker affixed to the predetermined surface F, or a mark printed, painted or otherwise applied to the predetermined surface F.

In the present embodiment, the predetermined surface F is an X-Y surface passing through the origin of the robot coordinate system and perpendicular to the Z-axis, but the orientation or position of the predetermined surface F is not limited to specific orientation or a specific position. Steps S1 to S8 of the calibration method will each be described below in detail.

First Translation Step S1

FIGS. 3 and 4 show a standby state before acquisition of the calibration start instruction from the operator. Upon acquisition of the calibration start instruction from the operator, the control apparatus 5 starts the first translation step S1. In the present step S1, the control apparatus 5 moves TCP in such a way that a criterion point Mo, which is the center of the marker M, is located at a predetermined position in the image P captured with the camera 4, or, in the present embodiment, at the center Po of the image P, as shown in FIGS. 5 and 6. This state is also hereinafter called a "first state". In the present embodiment, the image P is synonymous with the "field of view of the camera 4".

Specifically, when the calibration start instruction is inputted, the control apparatus 5 instructs the camera 4 to capture an image and acquires an image P1 from the camera 4, as shown in FIG. 7. The control apparatus 5 then detects the position of the criterion point Mo in the camera coordinate system from the acquired image P1. A pre-provided template of the marker M is used to detect the criterion point Mo. That is, the criterion point Mo is detected by template matching. The method for detecting the position of the criterion point Mo is, however, not limited to a specific method. Thereafter, the control apparatus 5 translates TCP by a predetermined distance in each of the X- and Y-axis directions, then instructs the camera 4 to capture an image, and acquires an image P2 from the camera 4. The control apparatus 5 then detects the position of the criterion point Mo in the camera coordinate system from the acquired image P2.

Thereafter, based on the coordinates of TCP in the robot coordinate system at the time of capturing the image P1, the coordinates of the criterion point Mo in the camera coordinate system detected from the image P1, the coordinates of TCP in the robot coordinate system at the time of capturing the image P2, and the coordinates of the criterion point Mo in the camera coordinate system detected from the image P2, the control apparatus 5 derives a coordinate conversion matrix that converts the displacement of the criterion point Mo in the camera coordinate system into the displacement of the criterion point Mo in the robot coordinate system.

The control apparatus 5 then derives any deviation of the criterion point Mo from the center Po of the image P based on the image P2, and converts the derived deviation into the deviation in the X- and Y-axis directions of the robot coordinate system by using the coordinate conversion matrix. The control apparatus 5 then derives a target value of TCP (amounts of movement in X- and Y-axis directions) for positioning the criterion point Mo at the center Po of the image P. The control apparatus 5 then moves the arm 22 based on the derived target value described above. As a result, TCP translates in the X and Y-axis directions, and the criterion point Mo is located at the center Po of the image P.

Note that the center Po of the image P is located on the optical axis of the lens 42 and is therefore less affected by distortion produced by the lens 42 than the other portions of the image P. A more accurate coordinate conversion matrix can therefore be derived by setting the predetermined position in the image P as the center Po. More accurate calibration can thus be performed. Note, however, that the predetermined position in the image P is not limited to the center Po, and may be a position separate from the center Po.

The method for moving the criterion point Mo to the center Po of the image P is not limited to a specific method. For example, a plurality of images P may be captured in the process of moving the criterion point Mo to the center Po, and based on the plurality of captured images P, feedback control may be so performed that the criterion point Mo is located at the center Po of the image P. Specifically, the control apparatus 5 first acquires an image P from the camera 4, derives a target value that allows the criterion point Mo to move to the center Po of the image P, and moves TCP based on the derived target value. The control apparatus 5 then acquires another image P from the camera 4, derives the distance between the center Po of the image P and the criterion point Mo, and evaluates whether the separation distance between the center Po and the criterion point Mo is smaller than a predetermined threshold. When the separation distance between the center Po and the criterion point Mo is not smaller than the threshold, the control apparatus 5 repeatedly derives a target value and moves TCP in such a way that the criterion point Mo moves to the center Po until the separation distance between the center Po and the criterion point Mo is smaller than the threshold. The method described above can also accurately and readily move the criterion point Mo to the center Po of the image P.

First Rotation Step S2

In the first rotation step S2, the control apparatus 5 moves the arm 22 of the robot 2 to rotate the camera 4 by a first angle of rotation θ1 around a first imaginary axis Ja perpendicular to the predetermined surface F and passing through TCP, as shown in FIGS. 8 and 9. In other words, the camera 4 is rotated by the first angle of rotation θ1 around the Z-axis with TCP being the center of rotation. The state after the rotation is also hereinafter called a "second state".

In this step, the camera 4 draws an arcuate trajectory around the first imaginary axis Ja. A radius r1 of the arc is equal to the distance from the first imaginary axis Ja to the camera 4 (distance from TCP to optical axis of camera 4), and the central angle of the arc is equal to the first angle of rotation θ1.

The first angle of rotation θ1 (note that 0<θ1<360) may be small, for example, preferably 45° or smaller, more preferably 30° or smaller, still more preferably 15° or smaller. In the present embodiment, in particular, the first angle of rotation θ1=5°. When the first angle of rotation θ1 is set at a relatively small angle as described above, the amount of movement of the camera 4 in the transition from the first state to the second state is suppressed, whereby the marker M is allowed to remain in the image P also in the second state. As a result, the following second translation step S3 can be readily carried out. Furthermore, the first rotation step S2 can be completed in a short time, whereby the period required for the calibration can also be shortened. The first angle of rotation θ1 is not limited to a specific value as long as the marker M is allowed to remain in the image P also in the second state.

Second Translation Step S3

In the second translation step S3, the control apparatus 5 moves TCP in such a way that criterion point Mo is located at the center Po of the image P captured with the camera 4, as shown in FIGS. 10 and 11. This state is also hereinafter called a "third state".

Specifically, when the first rotation step S2 is completed, the control apparatus 5 instructs the camera 4 to capture an image and acquires an image P3 from the camera 4, as shown in FIG. 12. The control apparatus 5 then derives any deviation of the criterion point Mo from the center Po of the image P based on the acquired image P3. The control apparatus 5 then converts the derived deviation into the deviation in the X- and Y-axis directions of the robot coordinate system by using the coordinate conversion matrix derived in the first translation step S1. The control apparatus 5 then derives a target value of TCP for positioning the criterion point Mo at the center Po of the image P. The control apparatus 5 then moves the arm 22 based on the derived target value. As a result, TCP translates in the X and Y-axis directions, and the criterion point Mo is located at the center Po of the image P.

The method for positioning the criterion point Mo at the center Po of the image P is not limited to a specific method. For example, a plurality of images P may be captured in the process of moving the criterion point Mo to the center Po, and based on the plurality of captured images P, feedback control may be so performed that the criterion point Mo is located at the center Po of the image P. The feedback control is the same as that described in the description of the first translation step S1, and will therefore not be specifically described.

Reference Point Derivation Step S4

In the reference point derivation step S4, a reference point Q, which is a provisional position of the criterion point Mo, is determined based on information on the first state, information on the third state, and the first angle of rotation θ1. Specifically, for each of the first and third states, the control apparatus 5 formulates simultaneous equations in which the coordinates (X, Y) of TCP in the robot coordinate system are expressed by the coordinates (X, Y) of the criterion point Mo in the robot coordinate system, the first angle of rotation θ1, and the radius r1. The control apparatus 5 then solves the simultaneous equations to derive the coordinates (X, Y) of the criterion point Mo in the robot coordinate system. The thus derived coordinates (X, Y) of the criterion point Mo represent a provisional position of the criterion point Mo, and is also hereinafter called a "reference point Q". Thus deriving the reference point Q, which is a provisional position of the criterion point Mo, allows the subsequent steps to be smoothly carried out.

The greater the first angle of rotation θ1 (closer to 180°), the greater the difference between the first and second states, so that the reference point Q is derived more accurately. The reference point Q is, however, a provisional position of the criterion point Mo as described above and therefore does not need to be derived accurately. In view of the fact described above, in the first rotation step S2 described above, the first angle θ1 is set at a small value to keep the marker M in the image P in preference to the accuracy of the derivation of the reference point Q. In the present embodiment, the first angle of rotation θ1 is set at 5°.

Second Rotation Step S5

In the second rotation step S5, the control apparatus 5 moves the arm 22 of the robot 2 to rotate the camera 4 by a second angle of rotation θ2 around a second imaginary axis Jb perpendicular to the predetermined surface F and passing through the reference point Q, as shown in FIGS. 13 and 14. In other words, the camera 4 is rotated by the second angle of rotation θ2 around the Z-axis with the reference point Q being the center of rotation. This state is also hereinafter called a "fourth state". FIGS. 13 and 14 show that the criterion point Mo and the reference point Q coincide with each other, but may deviate from each other depending on the accuracy of the derivation because the reference point Q is a provisional position of the criterion point Mo.

In this step, the camera 4 draws an arcuate trajectory around the second imaginary axis Jb. A radius r2 of the arc is equal to the distance from the second imaginary axis Jb to the camera 4 (distance from second imaginary axis Jb to optical axis of camera 4), and the central angle of the arc is equal to the second angle of rotation θ2.

The second angle of rotation θ2 (note that 0<θ2<360) is not limited to a specific value, but is preferably greater than the first angle of rotation θ1 described above. The term "greater" means that the difference from 180° is smaller. That is, it is preferable that |180°−θ1|>|180°−θ2|. Specifically, $60°≤θ2≤300°$ is preferably satisfied, $120°≤θ2≤240°$ is more preferably satisfied, and $170°≤θ2≤190°$ is still more preferably satisfied. In the present embodiment, in particular, the second angle of rotation θ2=180°. The difference between the first state and a fifth state, which will be described later, thus increases, and the position of the criterion point Mo can be accurately derived accordingly in the subsequent criterion point derivation step S7.

In the fourth state, the reference point Q is located in the vicinity of the center Po of the image P. Therefore, in the present step S5, the camera 4 rotates around the Z-axis with the center of rotation being in the vicinity of the center Po of the image P. Therefore, even when the second angle of rotation θ2 is increased, the marker M is allowed to remain in the image P. The following third translation step S6 can thus be readily carried out. The greater the second angle of rotation θ2, the greater the difference between the fourth state and the fifth state, whereby the criterion point Mo can be more accurately derived in the subsequent criterion point derivation step S7.

Third Translation Step S6

In the third translation step S6, the control apparatus 5 moves the arm 22 of the robot 2 to move TCP in such a way that the criterion point Mo is located at the center Po of the image P captured with the camera 4, as shown in FIGS. 15 and 16. This state is also hereinafter called a "fifth state".

Specifically, when the second rotation step S5 is completed, the control apparatus 5 instructs the camera 4 to capture an image and acquires an image P4 from the camera 4, as shown in FIG. 17. The control apparatus 5 then derives any deviation of the criterion point Mo from the center Po of the image P based on the acquired image P4. The control apparatus 5 then converts the derived deviation into the deviation in the X- and Y-axis directions of the robot coordinate system by using the coordinate conversion matrix derived in the first translation step S1. The control apparatus 5 then derives a target value of TCP for positioning the criterion point Mo at the center Po of the image P. The control apparatus 5 then moves the arm 22 based on the derived target value. As a result, TCP translates in the X and Y-axis directions, and the criterion point Mo is located at the center Po of the image P.

The method for positioning the criterion point Mo at the center Po of the image P is not limited to a specific method. For example, a plurality of images P may be captured in the process of moving the criterion point Mo to the center Po, and based on the plurality of captured images P, feedback control may be so performed that the criterion point Mo is located at the center Po of the image P. The feedback control is the same as that described in the description of the first translation step S1, and will therefore not be specifically described.

Depending on the accuracy of the derivation of the reference point Q, the criterion point Mo may coincide with the center Po, and the criterion point Mo do not deviate from the center Po in some cases even after the second rotation process S5. In this case, it is not necessary to translate TCP in the X- and Y-axis directions.

Criterion Point Derivation Step S7

In the criterion point derivation process S7, the position of the criterion point Mo is determined based on the information on the first state, information on the fifth state, and a total angle of rotation θt, over which the camera 4 rotates during the period from the first state to the fifth state, that is, the sum of the first angle of rotation θ1 and the second angle of rotation θ2. Specifically, for each of the third and fifth states, the control apparatus 5 formulates simultaneous equations in which the coordinates (X, Y) of TCP in the robot coordinate system are expressed by the coordinates (X, Y) of the criterion point Mo in the robot coordinate system, the total angle of rotation θt, and the radius r2 of the arc. The control apparatus 5 then solves the simultaneous equations to derive the coordinates (X, Y) of the criterion point Mo in the robot coordinate system.

As described above, since the second angle of rotation θ2 is set greater than the first angle of rotation θ1, the present step S7 allows the position of the criterion point Mo to be more accurately derived than the reference point derivation step S4.

In the above description, the position of the criterion point Mo is determined based on the information on the first state, the information on the fifth state, and the total angle of rotation θt, but not necessarily. For example, in the criterion point derivation process S7, the position of the criterion point Mo may be determined based on the information on the third state, the information on the fifth state, and the second angle of rotation θ2.

Calibration Step S8

In the calibration process S8, the calibration between the robot coordinate system and the image coordinate system is performed based on the position of the criterion point Mo in the robot coordinate system derived in the criterion point derivation process S7.

The calibration between the robot coordinate system and the image coordinate system is completed by carrying out the steps described above. According to the calibration method described above, the calibration between the robot coordinate system and the camera coordinate system can be automatically performed as long as TCP is moved to a position where an image of the marker M can be captured with the camera 4. The calibration between the robot coordinate system and the camera coordinate system can therefore be readily performed in a short period of time. The calibration method also has an advantage that allows the calibration between the robot coordinate system and the camera coordinate system to be performed, for example, even when the relative positional relationship between TCP and the camera 4 is unknown.

Furthermore, the action of the robot 2 during the calibration is simple because the calibration is performed by the combination of the translational motion (first, second, and third translation steps S1, S3, S6) and the rotational motion (first and second rotation steps S2, S5). Since the action of the robot 2 is simple as described above, the calibration between the robot coordinate system and the camera coordinate system can be performed in a short period of time with high accuracy. Furthermore, since the rotational motion is rotation around the Z-axis, the marker M is allowed to remain in the image P even in the configuration in which the optical axis of the camera 4 is perpendicular to the sixth pivotal axis O6, as in the present embodiment, whereby the calibration method also has an advantage that allows the calibration between the robot coordinate system and the camera coordinate system.

As an example of the tasks performed by the robot system 1, the task of transporting a workpiece W piled up on a table T to a destination will be described, as shown in FIG. 18. The control apparatus 5 first moves TCP in such a way that the camera 4 can capture an image of the workpiece W as the target object piled up on the table T. In this state, the optical axis of the camera 4 extends along the Z-axis. The control apparatus 5 then instructs the camera 4 to capture an image P containing at least one workpiece W and acquires the image P from the camera 4. The control apparatus 5 then extracts at least one workpiece W from the acquired image P and detects the position and posture of the extracted workpiece, for example, by template matching. The control apparatus 5 then derives the position and posture of TCP to be taken to grip the extracted workpiece W with the tool 24, and moves the robot 2 in such a way that TCP takes the derived position and posture. The control apparatus 5 then moves the tool 24 to grip the workpiece W. The control apparatus 5 then moves the robot 2 to transport the workpiece W to the destination.

The robot system 1 has been described. The calibration method executed by the thus configured robot system 1 is a method for performing the calibration between the robot coordinate system, which is the coordinate system of the robot 2 including the arm 22, and the camera coordinate system, which is the coordinate system of the camera 4 attached to the arm 22, as described above, and includes the first translation step S1, which is the step of moving the robot 2 to achieve the first state, in which the criterion point Mo located at the predetermined surface F is located at the center Po, which is the predetermined position in the image P captured with the camera 4, the first rotation step S2, which is the step of moving the robot 2 to achieve the second state, in which the camera 4 is rotated by the first angle of rotation θ1 around the first imaginary axis Ja perpendicular to the predetermined surface F and passing through TCP, which is the control point set at the arm 22, the second translational step S3, which is the step of moving the robot 2 to achieve the third state, in which the criterion point Mo is located at the center Po of the image P captured with the camera 4, the reference point derivation step S4, which is the step of deriving the reference point Q, which is a provisional position of the criterion point Mo, based on the information on the first state, the information on the third state, and the first angle of rotation θ1, the second rotation step S5, which is the step of moving the robot 2 to achieve the fourth state, in which the camera 4 is rotated by the second angle of rotation θ2 around the second imaginary axis Jb perpendicular to the predetermined surface F and passing through the reference point Q, the third translation step S6, which is the step of moving the robot 2 to achieve the fifth state, in which the criterion point Mo is located at the center Po of the image P captured with the camera 4, the criterion point derivation step S7, which is the step of deriving the position of the criterion point Mo from the information on the first state, the information on the fifth state, the first angle of rotation θ1, and the second angle of rotation θ2, or the information on the third state, the information on the fifth state, and the second angle of rotation θ2, and the calibration step S8, which is the step of performing the calibration between the robot coordinate system and the camera coordinate system based on the derived position of the criterion point Mo.

According to the calibration method described above, the calibration between the robot coordinate system and the camera coordinate system can be automatically performed as long as TCP is moved to a position where an image of the marker M can be captured with the camera 4. The calibration between the robot coordinate system and the camera coordinate system can therefore be readily performed in a short period of time. The calibration method also has an advantage that allows the calibration between the robot coordinate system and the camera coordinate system to be performed, for example, even when the relative positional relationship between TCP and the camera 4 is unknown.

Furthermore, the action of the robot 2 during the calibration is simple because the calibration is performed by the combination of the translational motion (first, second, and third translation steps S1, S3, S6) and the rotational motion (first and second rotation steps S2, S5). Since the action of the robot 2 is simple as described above, the calibration between the robot coordinate system and the camera coordinate system can be performed in a short period of time with high accuracy. Furthermore, since the rotational motion is rotation around the Z-axis, the marker M is allowed to remain in the image P even in the configuration in which the optical axis of the camera 4 is perpendicular to the sixth pivotal axis O6, as in the present embodiment, whereby the calibration method also has an advantage that allows the calibration between the robot coordinate system and the camera coordinate system.

In the first state, the optical axis of the camera 4 is perpendicular to the predetermined surface F, as described above. The orientation of the camera 4 can thus be aligned with that in an actual task, and the calibration between the robot coordinate system and camera coordinate system can be performed under the same conditions as those in the actual task. The actual task can thus be performed with greater accuracy.

Furthermore, the second angle of rotation θ2 is greater than the first angle of rotation θ1, as described above. The position of the criterion point Mo can thus be derived in the criterion point derivation step S7 more accurately than in the reference point derivation step S4.

The predetermined position is the center Po of the image P, as described above. The center Po of the image P is located on the optical axis of the lens 42 and is therefore less affected by distortion produced by the lens 42 than the other portions of the image P. A more accurate coordinate conversion matrix can therefore be derived by setting the center Po of the image P as the predetermined position. More accurate calibration can thus be performed.

In the second state, the criterion point Mo is located in the image P captured with the camera 4, as described above. The following second translation step S3 can thus be readily carried out.

In the fourth state, the criterion point Mo is located in the image P captured with the camera 4, as described above. The following third translation step S6 can thus be readily carried out.

The robot system 1 includes the robot 2 including the arm 22, the camera 4 attached to the arm 22, and the control apparatus 5, which controls the operation of driving the robot 2, as described above. To perform the calibration between the robot coordinate system, which is the coordinate system of the robot 2, and the camera coordinate system, which is the coordinate system of the camera 4, the control apparatus 5 carries out the first translation step S1, which is the step of moving the robot 2 to achieve the first state, in which the criterion point Mo located at the predetermined surface F is located at the center Po, which is the predetermined position in the image P captured with the camera 4, the first rotation step S2, which is the step of moving the robot 2 to achieve the second state, in which the camera 4 is rotated by the first angle of rotation θ1 around the first imaginary axis Ja perpendicular to the predetermined surface F and passing through TCP, which is the control point set at the arm 22, the second translational step S3, which is the step of moving the robot 2 to achieve the third state, in which the criterion point Mo is located at the center Po of the image P captured with the camera 4, the reference point derivation step S4, which is the step of deriving the reference point Q, which is a provisional position of the criterion point Mo, based on the information on the first state, the information on the third state, and the first angle of rotation θ1, the second rotation step S5, which is the step of moving the robot 2 to achieve the fourth state, in which the camera 4 is rotated by the second angle of rotation θ2 around the second imaginary axis Jb perpendicular to the predetermined surface F and passing through the reference point Q, the third translation step S6, which is the step of moving the robot 2 to achieve the fifth state, in which the criterion point Mo is located at the center Po of the image P captured with the camera 4, the criterion point derivation step S7, which is the step of deriving the position of the criterion point Mo from the information on the first state, the information on the fifth state, the first angle of rotation θ1, and the second angle of rotation θ2, or the information on the third state, the information on the fifth state, and the second angle of rotation θ2, and the calibration step S8, which is the step of performing the calibration between the robot coordinate system and the camera coordinate system based on the derived position of the criterion point Mo.

According to the robot system 1 described above, the calibration between the robot coordinate system and the camera coordinate system can be automatically performed as long as TCP is moved to a position where an image of the marker M can be captured with the camera 4. The calibration between the robot coordinate system and the camera coordinate system can therefore be readily performed in a short period of time. The calibration method also has an advantage that allows the calibration between the robot coordinate system and the camera coordinate system to be performed, for example, even when the relative positional relationship between TCP and the camera 4 is unknown.

Furthermore, the action of the robot 2 during the calibration is simple because the calibration is performed by the combination of the translational motion (first, second, and third translation steps S1, S3, S6) and the rotational motion (first and second rotation steps S2, S5). Since the action of the robot 2 is simple as described above, the calibration between the robot coordinate system and the camera coordinate system can be performed in a short period of time with high accuracy. Furthermore, since the rotational motion is rotation around the Z-axis, the marker M is allowed to remain in the image P even in the configuration in which the optical axis of the camera 4 is perpendicular to the sixth pivotal axis O6, as in the present embodiment, whereby the robot system 1 also has an advantage that allows the calibration between the robot coordinate system and the camera coordinate system.

The calibration method including the second translation step S3, the reference point derivation step S4, and the second rotation step S5 has been described above, but does not necessarily include these steps. The calibration method may instead include the first translation step S1, the first rotation step S2, the third translation step S6, the criterion point derivation step S7, and the calibration step S8.

That is, the calibration method performed by the robot system 1 is a method for performing the calibration between the robot coordinate system, which is the coordinate system of the robot 2 including the arm 22, and the camera coordinate system, which is the coordinate system of the camera 4 attached to the arm 22, and may include the first translation step S1, which is the step of moving the robot 2 to achieve the first state, in which the criterion point Mo located at the predetermined surface F is located at the center Po, which is the predetermined position in the image P captured with the camera 4, the first rotation step S2, which is the step of moving the robot 2 to achieve the fourth state, in which the camera 4 is rotated by the first angle of rotation θ1 around the first imaginary axis Ja perpendicular to the predetermined surface F and passing through TCP, which is the control point set at the arm 22, the third translation step S6, which is the step of moving the robot 2 to achieve the fifth state, in which the criterion point Mo is located at the center Po of the image P captured with the camera 4, the criterion point derivation step S7, which is the step of deriving the position of the criterion point Mo from the information on the first state, the information on the fifth state, and the first angle of rotation θ1, and the calibration step S8, which is the step of performing the calibration between the robot coordinate system and the camera coordinate system based on the derived position of the criterion point Mo. The method described above can also provide the same effects as those provided by the present embodiment.

In this case, the first angle of rotation θ1 is preferably 60°≤θ1≤300°, more preferably 120°≤θ1≤240°, still more preferably 170°≤θ1≤190°. The difference between the first state and the fifth state thus increases, and the position of the criterion point Mo can be accurately derived accordingly in the subsequent criterion point derivation step S7.

The case where the optical axis of the camera 4 is perpendicular to the predetermined surface F has been described above, but not necessarily. The optical axis of the camera 4 may incline with respect to a perpendicular to the predetermined surface F. Also in this case, the calibration method described above can be performed to provide the same effects described above.

Second Embodiment

Figure 19:
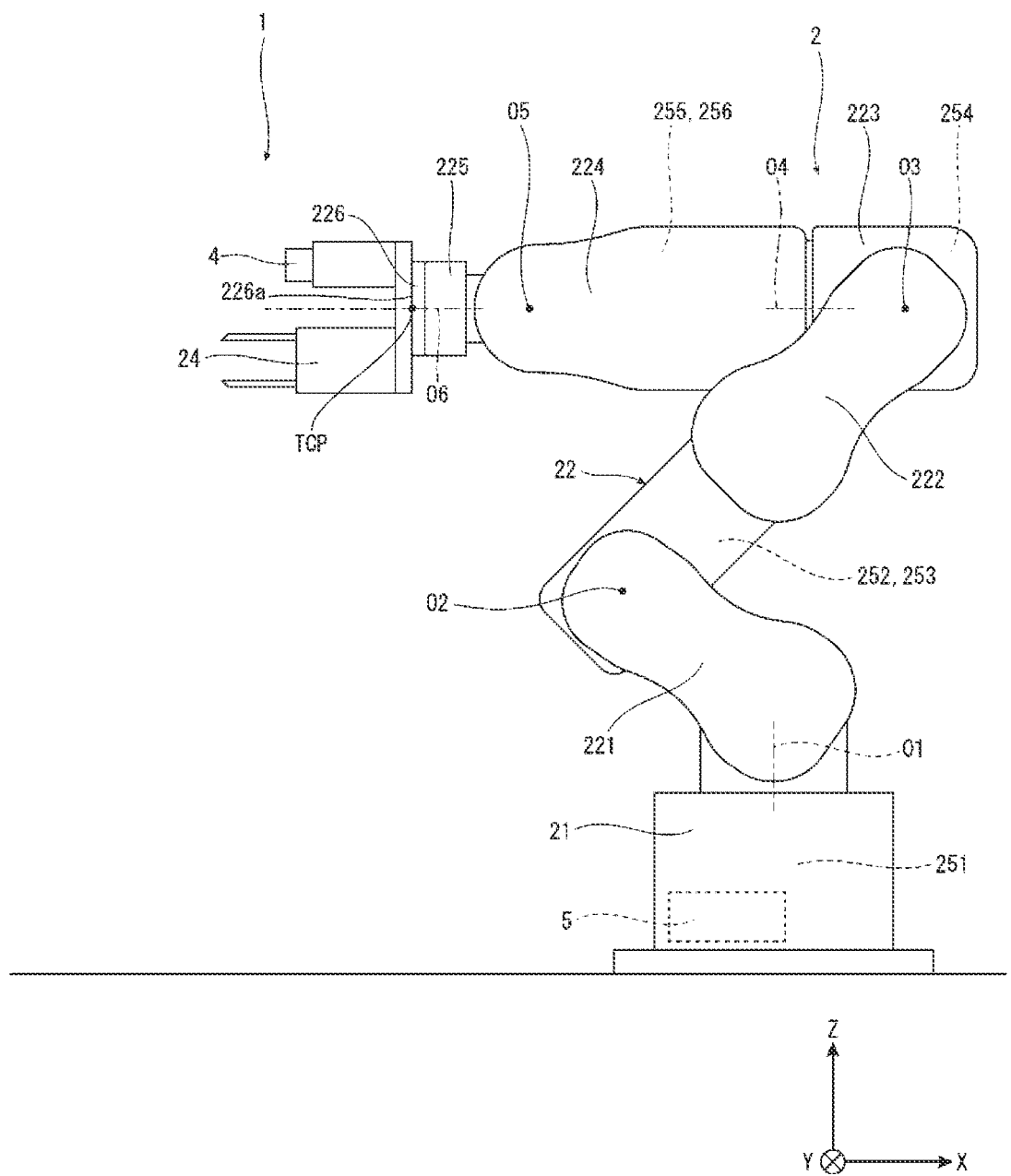
FIG. 19 is an overall configuration diagram of the robot system according to a second embodiment.

FIG. 19 is an overall configuration diagram of the robot system according to a second embodiment.

The robot system 1 according to the present embodiment is the same as the robot system 1 according to the first embodiment described above except that the arm 22 is equipped with the tool 24 and the camera 4 differently orientated. In the following description, the present embodiment will be described primarily on the difference from the embodiment described above, and the same items will not be described. In the figures used in the present embodiment, the same configurations as those in the embodiment described above have the same reference characters.

In the robot system 1 according to the present embodiment, the tool 24 and the camera 4 are disposed along the sixth pivotal axis O6, as shown in FIG. 19. The tool 24 and the camera 4 are offset from the sixth pivotal axis O6 and located on opposite sides of the sixth pivotal axis O6. The tool 24 disposed along the sixth pivotal axis O6 refers to a state in which a perpendicular passing through the position of the front end of the tool 24 and perpendicular to the tool attachment surface 226a is parallel to the sixth pivotal axis O6. The state in which the camera 4 is disposed along the sixth pivotal axis O6 means that the optical axis of the camera 4 is parallel to the sixth pivotal axis O6.

The thus configured second embodiment can also provide the same effects as those provided by the first embodiment by executing the same calibration method as that in the first embodiment described above.

Third Embodiment

Figure 20:
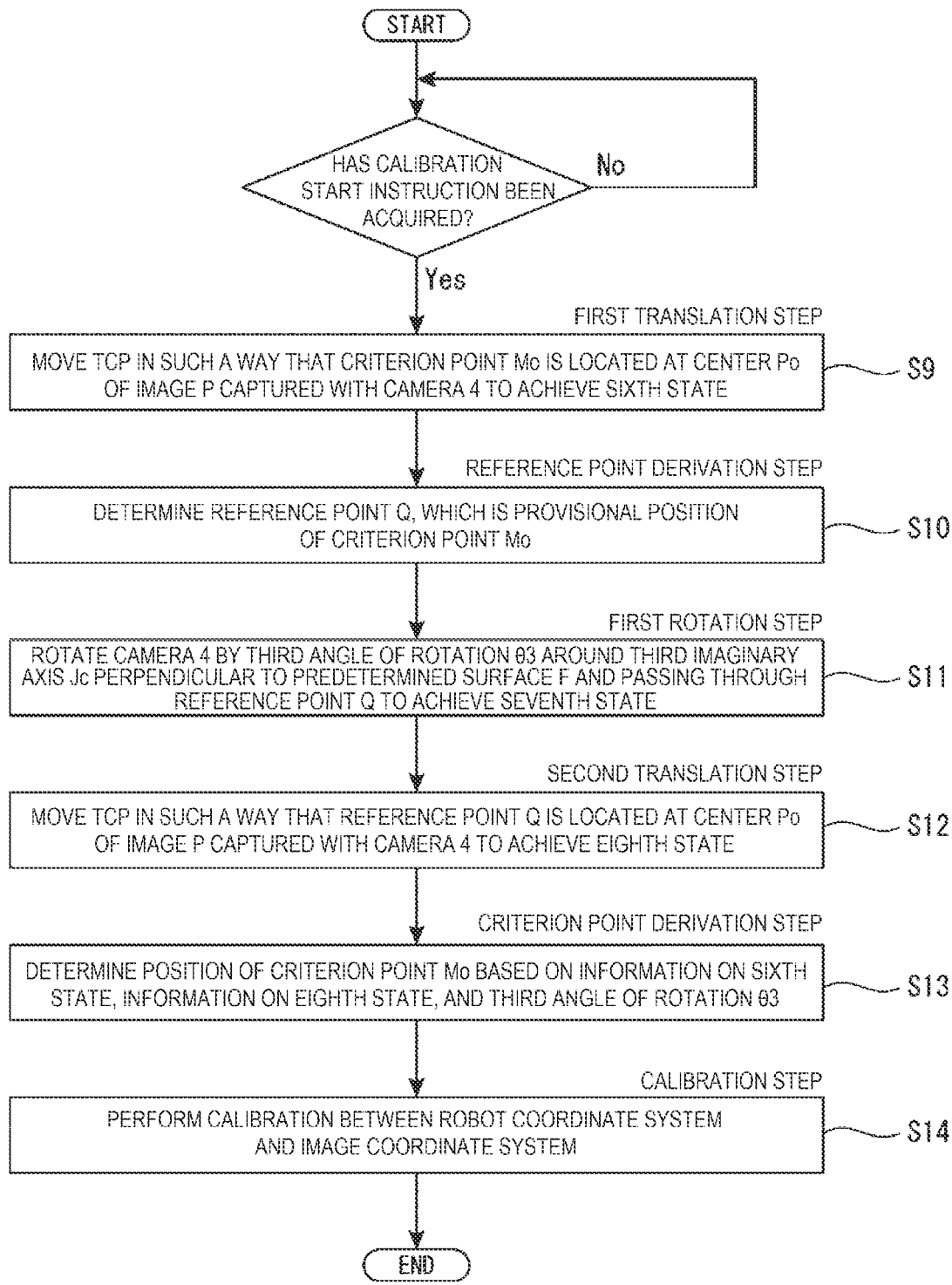
FIG. 20 is a flowchart showing the calibration method executed by the robot system according to a third embodiment.
Figure 21:
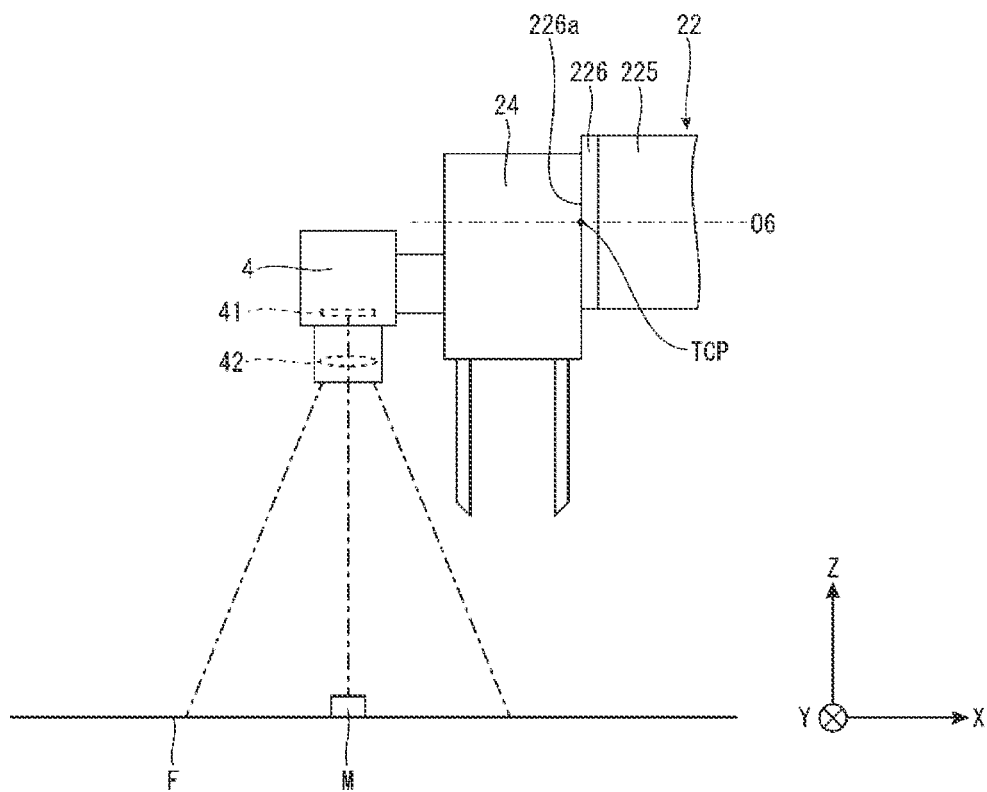
FIG. 21 shows the state of the robot system at the end of the first translation step.
Figure 22:
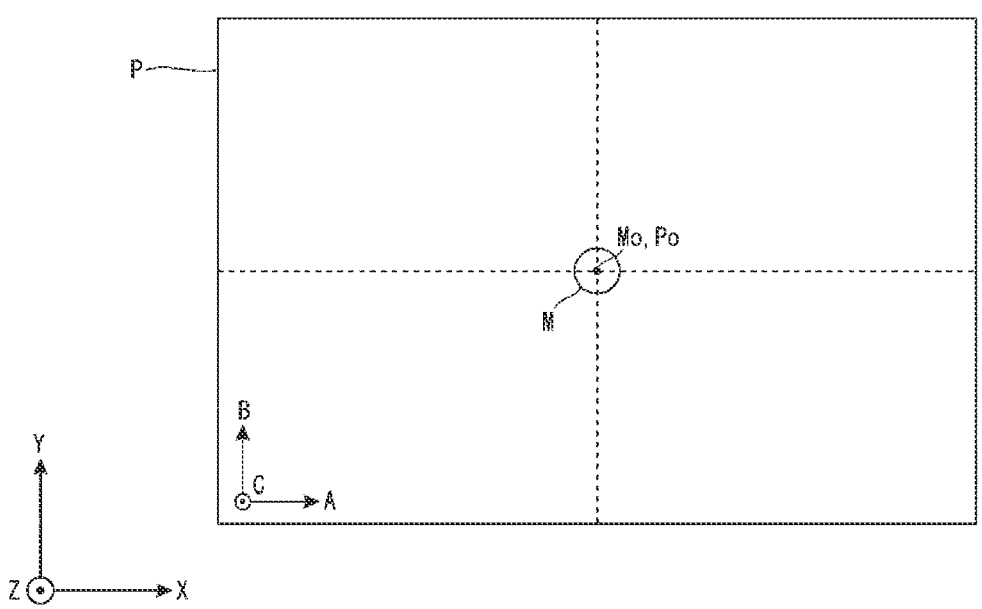
FIG. 22 shows an image captured with the camera at the end of the first translation step.
Figure 23:
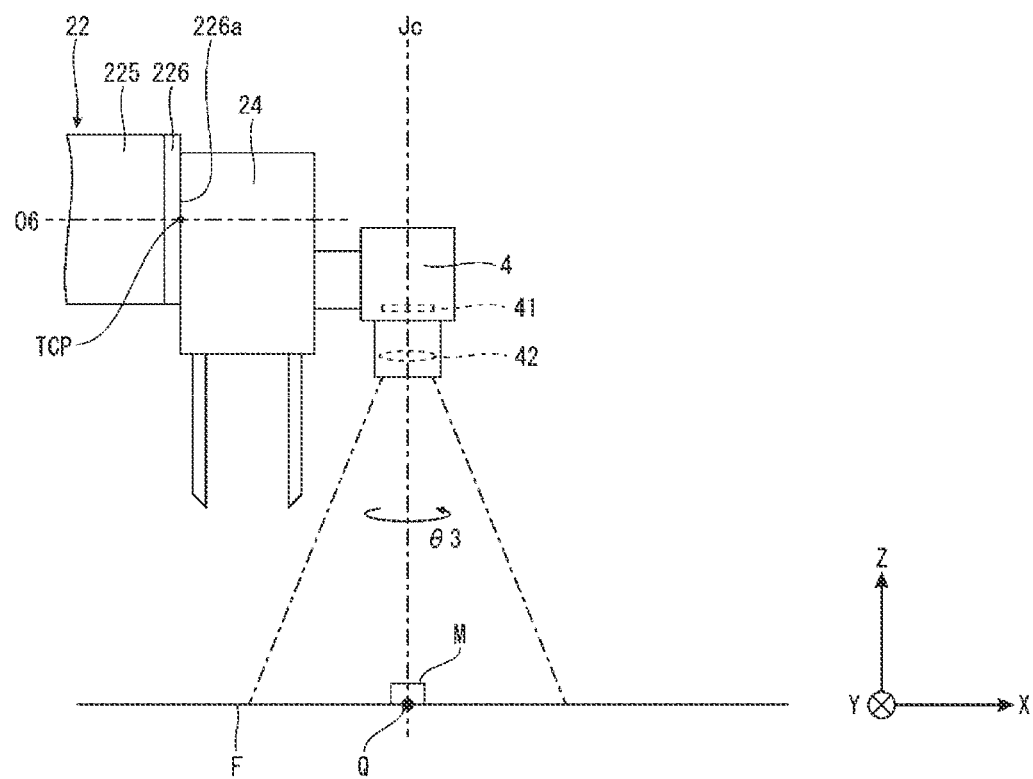
FIG. 23 shows the state of the robot system at the end of the first rotation step.
Figure 24:
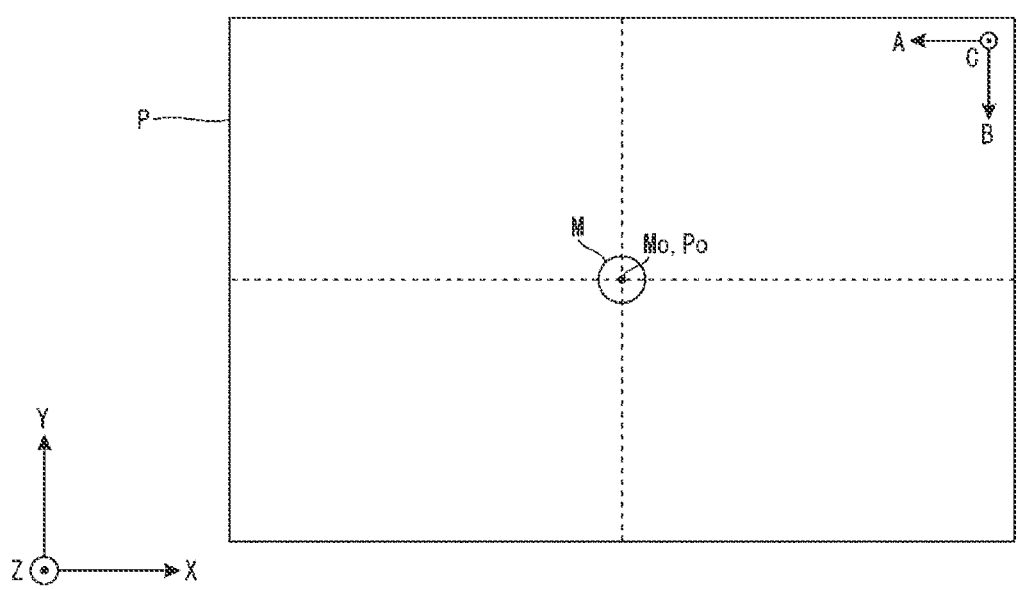
FIG. 24 shows an image captured with the camera at the end of the first rotation step.
Figure 25:
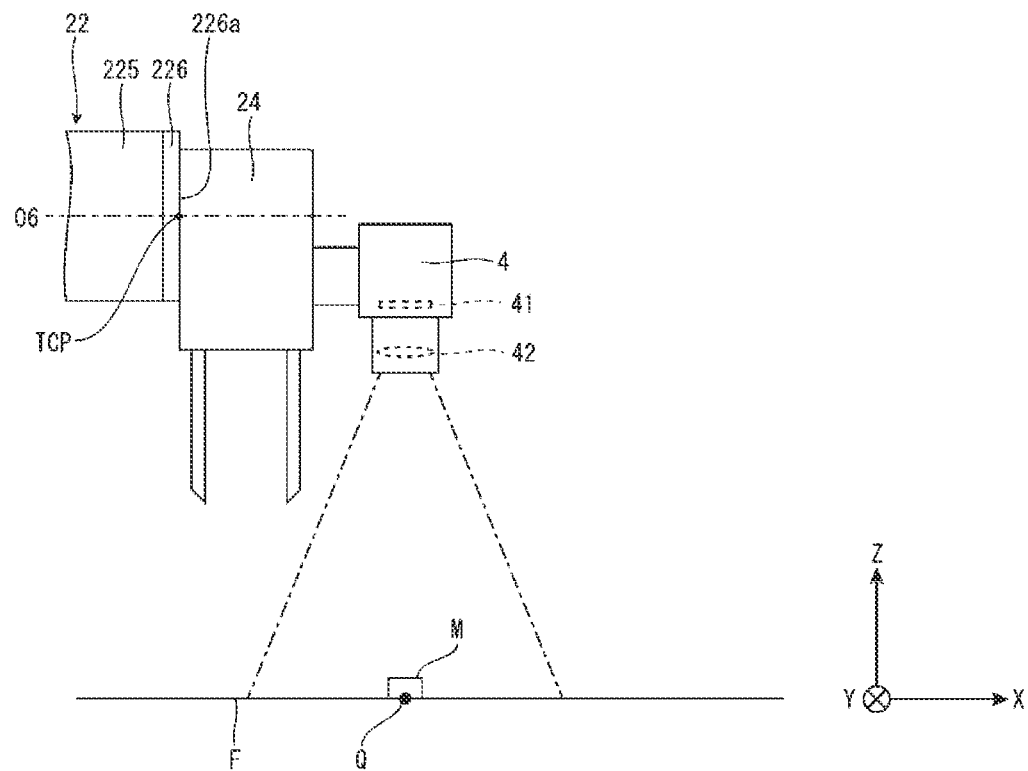
FIG. 25 shows the state of the robot system at the end of the second translation step.
Figure 26:
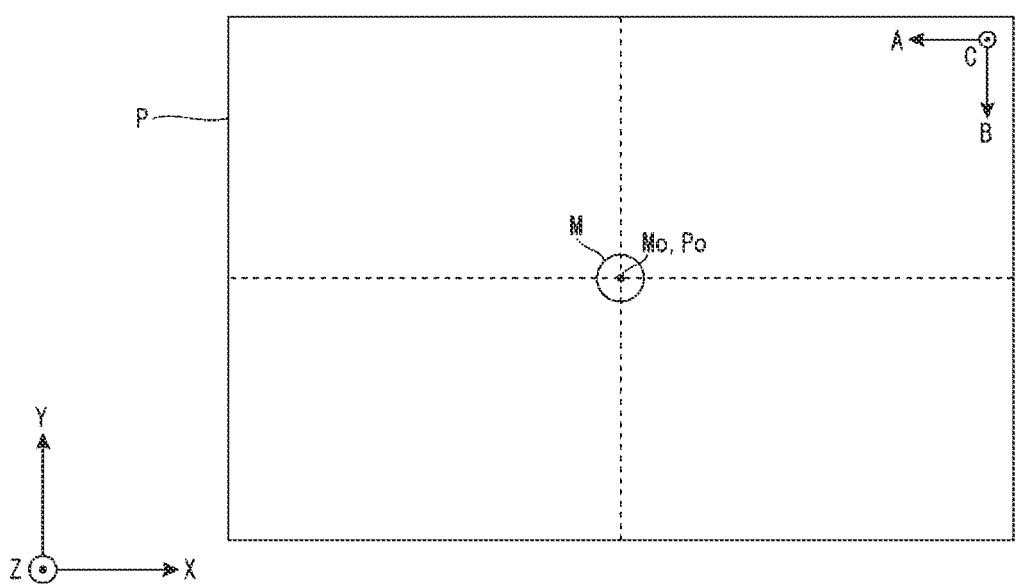
FIG. 26 shows an image captured with the camera at the end of the second translation step.

FIG. 20 is a flowchart showing the calibration method executed by the robot system according to a third embodiment. FIG. 21 shows the state of the robot system at the end of the first translation step. FIG. 22 shows an image captured with the camera at the end of the first translation step. FIG. 23 shows the state of the robot system at the end of the first rotation step. FIG. 24 shows an image captured with the camera at the end of the first rotation step. FIG. 25 shows the state of the robot system at the end of the second translation step. FIG. 26 shows an image captured with the camera at the end of the second translation step.

The robot system 1 according to the present embodiment is the same as the robot system 1 according to the first embodiment described above except that a different calibration method is executed. In the following description, the present embodiment will be described primarily on the difference from the embodiments described above, and the same items will not be described. In the figures used in the present embodiment, the same configurations as those in the embodiments described above have the same reference characters.

The calibration method according to the present embodiment includes a first translation step S9, a reference point derivation step S10, a first rotation step S11, a second translation step S12, a criterion point derivation step S13, and a calibration step S14, as shown in FIG. 20.

First Translation Step S9

Upon acquisition of the calibration start instruction from the operator, the control apparatus 5 starts the first translation step S9. In the present step S9, the control apparatus 5 moves TCP in such a way that the criterion point Mo, which is the center of the marker M, is located at the predetermined position in the image P captured with the camera 4, or, in the present embodiment, at the center Po of the image P, as shown in FIGS. 21 and 22. This state is also hereinafter called a "sixth state".

Reference Point Derivation Step S10

In the reference point derivation step S10, the reference point Q, which is a provisional position of the criterion point Mo, is determined. How to determine the reference point Q is not limited to a specific method. For example, the operator may input information on the position of the reference point Q in advance and determine the reference point Q based on the position information. Still instead, the reference point Q may be determined, for example, by a touch-up action of causing the tool 24 to be in contact with the marker M.

First Rotation Step S11

In the first rotation step S11, the control apparatus 5 moves the arm 22 of the robot 2 to rotate the camera 4 by a third angle of rotation θ3 around a third imaginary axis Jc perpendicular to the predetermined surface F and passing through the reference point Q, as shown in FIGS. 23 and 24. In other words, the camera 4 is rotated by the third angle of rotation θ3 around the Z-axis with the reference point Q being the center of rotation. This state is also hereinafter called a "seventh state".

The third angle of rotation θ3 (note that 0<θ3<360) is not limited to a specific angle, and satisfies, for example, preferably 60°≤θ3≤300°, more preferably 120°≤θ3≤240°, still more preferably 170°≤θ3≤190°. In the present embodiment, in particular, the third angle of rotation θ3=180°. The difference between the sixth state and an eighth state, which will be described later, thus increases, and the position of the criterion point Mo can be accurately derived accordingly in the subsequent criterion point derivation step S13.

Second Translation Step S12

In the second translation step S12, the control apparatus 5 moves the robot 2 to move TCP in such a way that reference point Q is located at the center Po of the image P captured with the camera 4, as shown in FIGS. 25 and 26. This state is also hereinafter called an "eighth state".

Criterion Point Derivation Step S13

In the criterion point derivation step S13, the position of the criterion point Mo is determined based on information on the sixth state, information on the eighth state, and the third angle of rotation θ3.

Calibration Step S14

In the calibration process S14, the calibration between the robot coordinate system and the image coordinate system is performed based on the position of the criterion point Mo in the robot coordinate system derived in the criterion point derivation process S13.

The calibration between the robot coordinate system and the image coordinate system is completed by carrying out the steps described above. According to the calibration method described above, the calibration between the robot coordinate system and the camera coordinate system can be automatically performed. The calibration between the robot coordinate system and the camera coordinate system can therefore be readily performed in a short period of time. The calibration method also has an advantage that allows the calibration between the robot coordinate system and the camera coordinate system to be performed, for example, even when the relative positional relationship between TCP and the camera 4 is unknown.

Furthermore, the action of the robot 2 during the calibration is simple because the calibration is performed by the combination of the translational motion and the rotational motion. Since the action of the robot 2 is simple as described above, the calibration between the robot coordinate system and the camera coordinate system can be performed in a short period of time with high accuracy. Furthermore, since the rotational motion is rotation around the Z-axis, the marker M is allowed to remain in the image P even in the configuration in which the optical axis of the camera 4 is perpendicular to the sixth pivotal axis O6, as in the present embodiment, whereby the calibration method described above also has an advantage that allows the calibration between the robot coordinate system and the camera coordinate system.

As described above, the calibration method according to the present embodiment is a method for performing the calibration between the robot coordinate system, which is the coordinate system of the robot 2 including the arm 22, and the camera coordinate system, which is the coordinate system of the camera 4 attached to the arm 22, and includes the first translation step S9, which is the step of moving the robot 2 to achieve the sixth state, in which the criterion point Mo located at the predetermined plane F is located at the center Po, which is the predetermined position in the image P captured with the camera 4, the criterion point derivation step S10, which is the step of deriving the reference point Q, which is a provisional position of the criterion point Mo, the first rotation step S11, which is the step of moving the robot 2 to achieve the seventh state, in which the camera 4 is rotated by the third angle of rotation θ3 around the third imaginary axis Jc perpendicular to the predetermined surface F and passing through the reference point Q, the second translation step S12, which is the step of moving the robot 2 to achieve the eighth state, in which the criterion point Mo is located at the center Po of the image P captured with the camera 4, the criterion point derivation step S13, which is the step of deriving the position of the criterion point Mo from the information on the sixth state, the information on the eighth state, and the third angle of rotation θ3, and the calibration step S14, which is the step of performing the calibration between the robot coordinate system and the camera coordinate system based on the derived position of the criterion point Mo.

According to the calibration method described above, the calibration between the robot coordinate system and the camera coordinate system can be automatically performed. The calibration between the robot coordinate system and the camera coordinate system can therefore be readily performed in a short period of time. The calibration method also has an advantage that allows the calibration between the robot coordinate system and the camera coordinate system to be performed, for example, even when the relative positional relationship between TCP and the camera 4 is unknown.

Furthermore, the action of the robot 2 during the calibration is simple because the calibration is performed by the combination of the translational motion and the rotational motion. Since the action of the robot 2 is simple as described above, the calibration between the robot coordinate system and the camera coordinate system can be performed in a short period of time with high accuracy. Furthermore, since the rotational motion is rotation around the Z-axis, the marker M is allowed to remain in the image P even in the configuration in which the optical axis of the camera 4 is perpendicular to the sixth pivotal axis O6, as in the present embodiment, whereby the calibration method described above also has an advantage that allows the calibration between the robot coordinate system and the camera coordinate system.

The thus configured third embodiment can provide the same effects as those provided by the first embodiment described above.

The calibration method and the robot system according to the present disclosure have been described above based on the embodiments shown in the drawings, but the present disclosure is not limited thereto, and the configuration of each portion can be replaced with any configuration having the same function. Furthermore, any other constituent element may be added to any of the embodiments of the present disclosure.

What is claimed is:

1. A method for performing calibration between a robot coordinate system that is a coordinate system of a robot including an arm and a camera coordinate system that is a coordinate system of a camera attached to the arm, the method comprising:
    moving the robot to achieve a first state in which a criterion point located at a predetermined surface is located at a predetermined position in an image captured with the camera;
    moving the robot to achieve a second state in which the camera is rotated by a first angle of rotation around a first imaginary axis perpendicular to the predetermined surface and passing through a control point set at the arm;
    moving the robot to achieve a third state in which the criterion point is located at the predetermined position in the image captured with the camera;
    deriving a reference point that is a provisional position of the criterion point based on information on the first state, information on the third state, and the first angle of rotation;
    moving the robot to achieve a fourth state in which the camera is rotated by a second angle of rotation around a second imaginary axis perpendicular to the predetermined surface and passing through the reference point;
    moving the robot to achieve a fifth state in which the criterion point is located at the predetermined position in the image captured with the camera;
    deriving a position of the criterion point from the information on the first state, information on the fifth state, the first angle of rotation, and the second angle of rotation, or the information on the third state, the information on the fifth state, and the second angle of rotation; and
    performing the calibration between the robot coordinate system and the camera coordinate system based on the derived position of the criterion point.

2. The calibration method according to claim 1, wherein an optical axis of the camera is perpendicular to the predetermined surface in the first state.

3. The calibration method according to claim 1, wherein the second angle of rotation is greater than the first angle of rotation.

4. The calibration method according to claim 1, wherein the predetermined position is a center of the image.

5. The calibration method according to claim 1, wherein in the second state, the criterion point is located in the image captured with the camera.

6. The calibration method according to claim 1, wherein in the fourth state, the criterion point is located in the image captured with the camera.

7. A method for performing calibration between a robot coordinate system that is a coordinate system of a robot including an arm and a camera coordinate system that is a coordinate system of a camera attached to the arm, the method comprising:
    moving the robot to achieve a first state in which a criterion point located at a predetermined surface is located at a predetermined position in an image captured with the camera;
    moving the robot to achieve a fourth state in which the camera is rotated by a first angle of rotation around a first imaginary axis perpendicular to the predetermined surface and passing through a control point set at the arm;
    moving the robot to achieve a fifth state in which the criterion point is located at the predetermined position in the image captured with the camera;
    deriving a position of the criterion point from information on the first state, information on the fifth state, and the first angle of rotation; and
    performing the calibration between the robot coordinate system and the camera coordinate system based on the derived position of the criterion point.

8. A method for performing calibration between a robot coordinate system that is a coordinate system of a robot including an arm and a camera coordinate system that is a coordinate system of a camera attached to the arm, the method comprising:
    moving the robot to achieve a sixth state in which a criterion point located at a predetermined plane is located at a predetermined position in an image captured with the camera;
    deriving a reference point that is a provisional position of the criterion point;
    moving the robot to achieve a seventh state in which the camera is rotated by a third angle of rotation around a third imaginary axis perpendicular to the predetermined surface and passing through the reference point;
    moving the robot to achieve an eighth state in which the criterion point is located at the predetermined position in the image captured with the camera;
    deriving a position of the criterion point from information on the sixth state, information on the eighth state, and the third angle of rotation; and
    performing the calibration between the robot coordinate system and the camera coordinate system based on the derived position of the criterion point.

9. A robot system comprising:
    a robot including the arm;
    a camera attached to the arm; and
    a control apparatus that controls the operation of driving the robot,
    wherein to perform calibration between a robot coordinate system that is a coordinate system of the robot and a camera coordinate system that is a coordinate system of the camera, the control apparatus
    moves the robot to achieve a first state in which a criterion point located at a predetermined surface is located at a predetermined position in an image captured with the camera,
    moves the robot to achieve a second state in which the camera is rotated by a first angle of rotation around a first imaginary axis perpendicular to the predetermined surface and passing through a control point set at the arm,
    moves the robot to achieve a third state in which the criterion point is located at the predetermined position in the image captured with the camera,
    derives a reference point that is a provisional position of the criterion point based on information on the first state, information on the third state, and the first angle of rotation,
    moves the robot to achieve a fourth state in which the camera is rotated by a second angle of rotation around a second imaginary axis perpendicular to the predetermined surface and passing through the reference point, moves the robot to achieve a fifth state in which the criterion point is located at the predetermined position in the image captured with the camera, derives a position of the criterion point from the information on the first state, information on the fifth state, the first angle of rotation, and the second angle of rotation, or the information on the third state, the information on the fifth state, and the second angle of rotation, and performs the calibration between the robot coordinate system and the camera coordinate system based on the derived position of the criterion point.

* * * * *